US012473887B2

(12) United States Patent
Nohara et al.

(10) Patent No.: US 12,473,887 B2
(45) Date of Patent: Nov. 18, 2025

(54) WIND POWER GENERATION DEVICE CONTROL SYSTEM AND BLADE WIND DETECTING DEVICE

(71) Applicant: Nabtesco Corporation, Tokyo (JP)

(72) Inventors: Osamu Nohara, Tokyo (JP); Hirofumi Komori, Tokyo (JP)

(73) Assignee: NABTESCO CORPORATION, Tokyo (JP)

( * ) Notice: Subject to any disclaimer, the term of this patent is extended or adjusted under 35 U.S.C. 154(b) by 0 days.

(21) Appl. No.: 18/455,150

(22) Filed: Aug. 24, 2023

(65) Prior Publication Data
US 2024/0077056 A1 Mar. 7, 2024

(30) Foreign Application Priority Data
Sep. 2, 2022 (JP) .................. 2022-140400

(51) Int. Cl.
F03D 7/02 (2006.01)
F03D 17/00 (2016.01)

(52) U.S. Cl.
CPC ......... F03D 7/0224 (2013.01); F03D 17/028 (2023.08); F05B 2270/32 (2013.01); F05B 2270/321 (2013.01); F05B 2270/328 (2013.01); F05B 2270/329 (2013.01); F05B 2270/80 (2013.01)

(58) Field of Classification Search
CPC .... F03D 7/0224; F03D 17/028; F03D 17/011; F03D 7/0204; F05B 2270/32; F05B 2270/321; F05B 2270/328; F05B 2270/329; F05B 2270/80; F05B 2260/821; Y02E 10/72

USPC ..................................... 290/44, 55
See application file for complete search history.

(56) References Cited

U.S. PATENT DOCUMENTS

2003/0127862 A1* 7/2003 Weitkamp ............... F03D 7/043
290/44
2004/0112131 A1* 6/2004 Wobben ................ F03D 7/0224
73/170.15
2007/0124025 A1* 5/2007 Schram ................. F03D 7/0276
290/44

(Continued)

FOREIGN PATENT DOCUMENTS

EP        3163274 A1      5/2017
EP        4001638 A1      5/2022
JP     2020-118076 A      8/2020

OTHER PUBLICATIONS

Partial European Search Report dated Jan. 23, 2024, issued in corresponding European Patent Application No. 23193176.7 (11 pgs.).

(Continued)

Primary Examiner — Charles Reid, Jr.
(74) Attorney, Agent, or Firm — Pillsbury Winthrop Shaw Pittman, LLP

(57) ABSTRACT

A wind power generation device control system includes: a blade wind detecting device for detecting at least one of a wind direction or a wind speed on at least one blade of a wind power generation device; and a blade control device for controlling at least one of (i) a pitch angle of the at least one blade or (ii) a yaw angle of the wind power generation device, based on at least one of the wind direction or the wind speed detected by the blade wind detecting device.

8 Claims, 15 Drawing Sheets

(56) References Cited

U.S. PATENT DOCUMENTS

| | | | | |
|---|---|---|---|---|
| 2010/0314873 | A1* | 12/2010 | Stone | F03D 7/0272 |
| | | | | 290/44 |
| 2012/0211986 | A1 | 8/2012 | Bertolotti et al. | |
| 2012/0257968 | A1* | 10/2012 | Dalsgaard | F03D 7/0264 |
| | | | | 416/37 |
| 2013/0038060 | A1* | 2/2013 | Odgaard | F03D 7/048 |
| | | | | 290/44 |
| 2013/0103202 | A1* | 4/2013 | Bowyer | F03D 7/0292 |
| | | | | 700/275 |
| 2015/0308413 | A1* | 10/2015 | Bhaskar | F03D 9/257 |
| | | | | 290/44 |

OTHER PUBLICATIONS

C.L. Bottasso et al. "Local wind speed estimation, with application to wake impingement detection", Renewable Energy, Pergamon Press, Oxford, GB, vol. 116, Sep. 21, 2017 (Sep. 21, 2017), pp. 155-168.

* cited by examiner

| Blade Identifi- cation Info | Axle Rotation Angle (Degrees) | Stress Detection Time | Stress Measured by Each Stress Sensor | | | | | | | | | | | | |
|---|---|---|---|---|---|---|---|---|---|---|---|---|---|---|---|
| | | | 410A | 410B | 410C | 410D | 410E | 410F | 410G | 410H | 410I | 410J | 410K | 410L |
| Blade 230a | 0 | 00:00:00 | 0 | 0 | 1 | 2 | 3 | 2 | 1 | 0 | 0 | 0 | 0 | 0 |
| Blade 230b | 180 | 00:00:02 | 0 | 0 | 0 | 0 | 0 | 0 | 0 | 2 | 3 | 4 | 3 | 2 |
| Blade 230c | 0 | 00:00:04 | 0 | 0 | 1 | 2 | 3 | 2 | 1 | 0 | 0 | 0 | 0 | 0 |
| Blade 230a | 180 | 00:00:06 | 0 | 0 | 0 | 0 | 0 | 0 | 0 | 2 | 3 | 4 | 3 | 2 |
| Blade 230b | 0 | 00:00:08 | 0 | 0 | 1 | 2 | 3 | 2 | 1 | 0 | 0 | 0 | 0 | 0 |
| Blade 230c | 180 | 00:00:10 | 0 | 0 | 0 | 0 | 0 | 0 | 0 | 2 | 3 | 4 | 3 | 2 |

Fig. 8

| Wind Speed (m/sec) | Wind Speed Detection Time | Wind Direction |
|---|---|---|
| 10 | 00:00:00 | East-Southeast (120 Degrees) |
| 11 | 00:00:02 | East (90 Degrees) |
| 10 | 00:00:04 | East-Southeast (120 Degrees) |
| 11 | 00:00:06 | East (90 Degrees) |
| 10 | 00:00:08 | East-Southeast (60 Degrees) |
| 11 | 00:00:10 | East (120 Degrees) |

Fig. 9

WIND POWER GENERATION DEVICE CONTROL SYSTEM AND BLADE WIND DETECTING DEVICE

CROSS-REFERENCE TO RELATED APPLICATIONS

This application is based on and claims the benefit of priority from Japanese Patent Applications Serial No. 2022-140400 filed on Sep. 2, 2022, the contents of which are hereby incorporated by reference in their entirety.

TECHNICAL FIELD

Some aspects of the present disclosure relate to a wind power generation device control system and a blade wind detecting device.

BACKGROUND

Japanese Patent Application Publication No. 2020-118076 ("the '076 Publication") discloses a wind power generation device including a plurality of blades, a nacelle, and a tower. In the wind power generation device, a nacelle wind direction detecting device is provided on the nacelle to detect the wind direction. Based on the wind direction data detected by the nacelle wind direction detecting device, the wind power generation device controls the rotational angle (i.e., yaw angle) of the nacelle, which is mounted on the tower. This control is designed to enhance the power generated by the wind power generation device and to save the driving unit for driving the blades from being blown by a gust of wind.

In the wind power generation device disclosed in the '076 Publication, the blades can rotate in response to wind blowing toward the wind power generation device. The nacelle wind direction detecting device on the nacelle detects the wind passing between the blades. In the wind power generation device disclosed in the '076 Publication, the nacelle wind direction detecting device is positioned behind the blades. This means that the blades are distanced from the nacelle wind direction detecting device. The wind direction to be detected by the nacelle wind direction detecting device on the nacelle may be different from the wind direction on the blades. The wind power generation device disclosed in the '076 Publication may not be capable of accurately determining the wind direction on the blades for controlling the rotational angle (yaw angle) of the nacelle mounted on the tower.

SUMMARY

Some aspects of the present disclosure are intended to overcome the above problem, and one object thereof is to provide a wind power generation device control system and a blade wind detecting device that are capable of accurately determining the state of the wind acting upon the wind power generation device for driving the wind power generation device.

(1) A first aspect of the present disclosure provides a wind power generation device control system including: a blade wind detecting device for detecting at least one of a wind direction or a wind speed on at least one blade of a wind power generation device; and a blade control device for controlling at least one of (i) a pitch angle of the at least one blade or (ii) a yaw angle of the wind power generation device, based on at least one of the wind direction or the wind speed detected by the blade wind detecting device. In the implementation, the wind power generation device control system can accurately determine the state of the wind acting upon the wind power generation device for driving the wind power generation device.

(2) In the wind power generation device control system of the first aspect, the blade wind detecting device may include: at least one stress sensor provided on the at least one blade; and a transmitting unit provided on the at least one blade, the transmitting unit being configured to wirelessly transmit a measurement of the at least one stress sensor to the blade control device. In the implementation, the data of the direction and speed of the wind on the blade can be acquired via wireless communication even while the blade is rotating. The acquired data can be used to drive the wind power generation device.

(3) In the wind power generation device control system of the first aspect, the blade wind detecting device may include a plurality of stress sensors provided on the at least one blade along a circumferential direction. In the implementation, the stress sensors provided on the blade next to each other in the circumferential direction can tell the state of the wind from any direction within 360 degrees around the blade. Accordingly, the wind power generation device control system can accurately determine the state of the wind acting upon the blade for driving the wind power generation device.

(4) In the wind power generation device control system of the first aspect, the blade control device may include a pitch angle acquiring unit for acquiring a pitch angle of the at least one blade. The blade wind detecting device may include a wind direction detecting unit for determining a direction faced by at least one of the stress sensors based on the pitch angle at a time of measuring by the stress sensors and detecting a wind direction on the at least one blade based on the determined direction and measurements by the respective stress sensors. The pitch angle of the blade may vary, but the wind power generation device control system of the implementation can still accurately locate the stress sensors attached to the blade, thereby accurately determining the wind direction and speed.

(5) In the wind power generation device control system of the first aspect, the blade wind detecting device may include: a rotational angle acquiring unit for acquiring a rotational angle of rotation of the at least one blade about an axle, the rotation being caused by wind acting upon the at least one blade; and a wind direction detecting unit for determining a direction faced by at least one of the stress sensors based on the rotational angle at a time of measuring by the stress sensors and detecting a wind direction on the at least one blade based on the determined direction and measurements by the respective stress sensors. In the implementation, even while the blade is rotating, the stress sensors attached to the blade can be accurately located, so that the wind direction and speed can be accurately determined.

(6) In the wind power generation device control system of the first aspect, the blade wind detecting device may include: an association information storage unit for storing association information indicating an association between a wind speed and measurements by the stress sensors; an index value calculating unit for calculating an index value by statistically processing the measurements by the stress sensors; and a wind speed detecting unit for detecting a wind speed on the at least one blade based on the index value and the association information. In the implementation, the association information is generated in advance that indicates the wind speed and the measurement of the stress sensors associated with each other. Since the wind speed is detected based on the association information generated in advance, the detection imposes less load.

(7) The wind power generation device control system of the first aspect may further include a nacelle wind direction detecting device attached to a nacelle of the wind power generation device. The blade control device may control at least one of the pitch angle or the yaw angle based on a wind direction detected by the nacelle wind direction detecting device, until the at least one blade reaches rated rotation. The blade control device may control at least one of the pitch angle or the yaw angle based on the wind direction detected by the blade wind detecting device, while the at least one blade keeps the rated rotation. In the implementation, after the blade of the wind power generation device reaches rated rotation, the wind power generation device is driven based on the wind direction detected by the detecting unit provided on the blade, in place of the wind direction detected by the wind direction detecting device attached to the nacelle. Accordingly, the wind power generation device can appropriately determine the state of the wind while generating power for driving the wind power generation device.

(8) In the wind power generation device control system of the first aspect, the blade control device may further include: a deviation calculating unit for calculating a wind direction deviation indicating a change in the wind direction observed over a predetermined period; a load detecting device for detecting a load applied onto a yaw drive device configured to adjust the yaw angle through rotation; and an output device for, when the load applied onto the yaw drive device exceeds a predetermined threshold, outputting to an external device the wind direction deviation and the load applied onto the yaw drive device observed over a specific period of time including a point of time when the load applied onto the yaw drive device exceeds the predetermined threshold. In the implementation, the data of the load measured by the load measuring unit and the data detected by the detecting unit provided on the blade do not need to be stored on the wind power generation device. This can result in reducing the storage capacity of the wind power generation device, and the data transmitted to the external device can be used to understand the state of the wind power generation device.

(9) In the wind power generation device control system of the first aspect, the blade control device may further include: a deviation calculating unit for calculating a wind direction deviation indicating a change in the wind direction observed over a predetermined period; a load detecting device for detecting a load applied onto a yaw drive device configured to adjust the yaw angle through rotation; and an output device for, when the wind direction deviation exceeds a predetermined threshold, outputting to an external device the wind direction deviation and the load applied onto the yaw drive device observed over a specific period of time including a point of time when the wind direction deviation exceeds the predetermined threshold. In the implementation, the data of the load measured by the load measuring unit and the data detected by the detecting unit provided on the blade do not need to be stored on the wind power generation device. This can result in reducing the storage capacity of the wind power generation device, and the data transmitted to the external device can be used to understand the state of the wind power generation device.

(10) A second aspect of the present disclosure provides a wind power generation device control system including a stress sensor for measuring stress applied to at least one blade of a wind power generation device; and a release unit for, based on a measurement by the stress sensor, stopping an output from a yaw drive device configured to adjust a yaw angle of the at least one blade through rotation and releasing braking applied by a brake mechanism configured to brake the rotation caused by the yaw drive device. The implementation can prevent the yaw drive device from malfunctioning. If a strong force acts upon the blade, the yaw drive device is not driven.

(11) In the wind power generation device control system of the first aspect, when Z denotes a distance from a root of the at least one blade to a tip of the at least one blade, the at least one stress sensor may be provided in an area originating from the root of the at least one blade and spanning a distance of 0 to Z/8 toward the tip of the at least one blade. In the implementation, the blade wind detecting device moves a shorter distance upon rotation of the blade following the rotation of the axle. The implementation can thus reduce the influence caused by the axle rotation, so that the blade can more accurately detect the wind acting upon the wind power generation device.

(12) A third aspect of the present disclosure provides a blade wind detecting device including: a detecting unit for detecting at least one of a wind direction or a wind speed on at least one blade of a wind power generation device; and a transmitting unit for wirelessly transmitting at least one of the wind direction or the wind speed detected by the detecting unit to a blade control device provided in a nacelle that has a power generator installed therein, the power generator being configured to generate power through rotation of the at least one blade. In the implementation, the blade wind detecting device can accurately determine the state of the wind acting upon the wind power generation device for driving the wind power generation device.

Some aspects of the present disclosure can accurately determine the state of the wind acting upon the wind power generation device for driving the wind power generation device.

BRIEF DESCRIPTION OF THE DRAWINGS

FIG. 8 shows an example of data measured by stress sensors 410A to 410L according to the first embodiment of the present disclosure.

FIG. 9 shows an example of data generated by a control unit of the blade control device relating to the first embodiment of the present disclosure.

DESCRIPTION OF THE PREFERRED EMBODIMENTS

Some embodiments of the present disclosure will be described below with reference to the accompanying drawings.

First Embodiment

Figure 1:
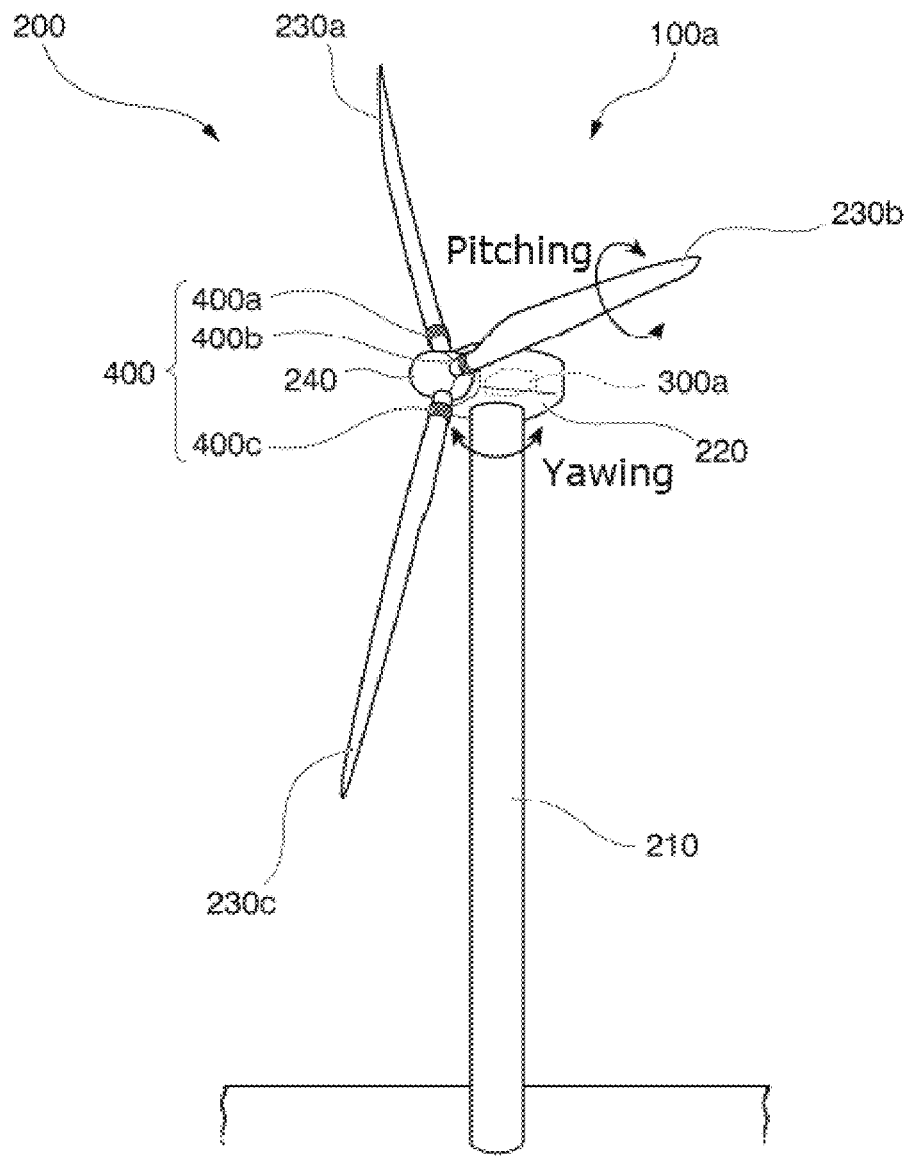
FIG. 1 is a perspective view showing an example of a wind power generation device control system according to a first embodiment of the present disclosure.

FIG. 1 is a perspective view showing an example of a wind power generation device control system 100a according to a first embodiment of the present disclosure. The wind power generation device control system 100a includes a wind power generation device 200, a blade control device 300a, and blade wind detecting devices 400 (blade wind detecting devices 400a, 400b, 400c).

The wind power generation device 200 includes a tower 210, a nacelle 220, blades 230a, 230b and 230c, and a hub 240. Although FIG. 1 shows the case where the wind power generation device 200 includes the blades 230a, 230b, and 230c, the present embodiment is not limited to such. The wind power generation device 200 may include two or fewer blades, or four or more blades. The tower 210 is a columnar structure. The tower 210 is installed such that its central axis is perpendicular to the ground. The nacelle 220 is mounted on the top end of the tower 210. The nacelle 220 is configured to rotate (yaw) around the central axis of the tower 210. The nacelle 220 has the blade control device 300a provided therein.

The blades 230a, 230b, and 230c are each shaped like an elongated flat plate. The blades 230a, 230b and 230c are mounted on the hub 240 such that they fixedly radiate from the hub 240. The longitudinal directions of two of the blades intersect at 120 degrees. The blades 230a, 230b, and 230c respectively have the blade wind detecting devices 400a, 400b, and 400c at their root for detecting the wind speed.

Figure 2:
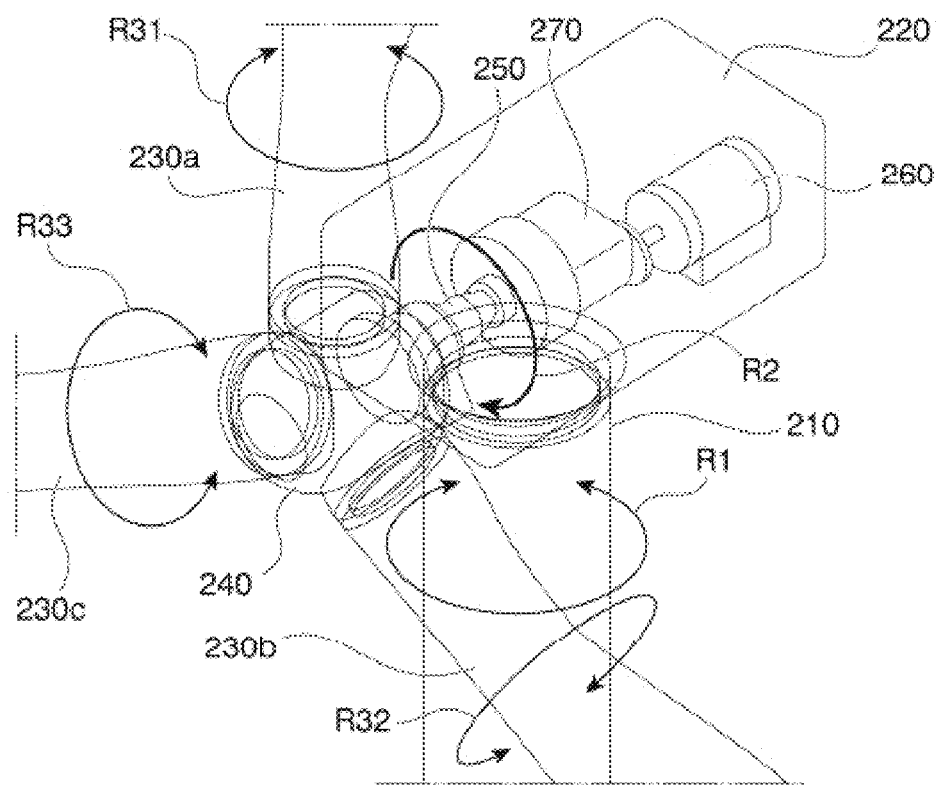
FIG. 2 is a schematic view showing the configuration of a nacelle included in a wind power generation device according to the first embodiment of the present disclosure.

FIG. 2 is a schematic view showing the configuration of the nacelle 220 and blades 230a, 230b and 230c of the wind power generation device 200 (see FIG. 1). The nacelle 220 has a power generator 260 disposed therein. An axle 250, which is connected to the hub 240, is rotated, and the rotation is increased by a speed increaser 270 and transmitted to the power generator 260. This results in power generation. Although the nacelle 220 has the blade control device 300a provided therein, FIG. 2 does not show the blade control device 300a. The wind power generation device 200 creates three types of rotations. The first one of them is yawing R1, where the nacelle 220 rotates about the central axis of the columnar tower 210. The second is axle rotation R2, where the hub 240 having the blades 230a, 230b and 230c attached thereto rotates about the axle 250, which is parallel to the ground. The third is pitching R31, R32, and R33, where the blades 230a 230b and 230c shaped like an elongated flat plate rotate about their longitudinal direction.

Figure 3:
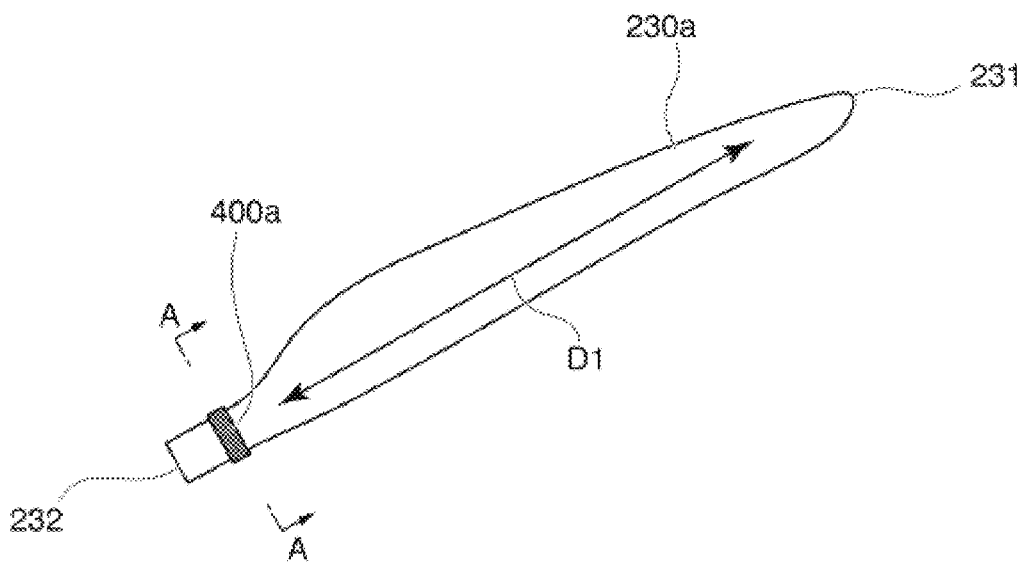
FIG. 3 is a schematic view showing the configuration of the blades included in the wind power generation device according to the first embodiment of the preset invention.

FIG. 3 is a schematic view showing the configuration of the blade 230a of the wind power generation device 200 (see FIG. 1). The blades 230b and 230c have the same configuration as the blade 230a shown in FIG. 3. The blade 230a, which has a root 232 and a tip 231, has an elongated flat plate shape extending in the longitudinal direction D1. The root 232 of the blade 230a is fixedly attached to the hub 240 such that the blade 230a can rotate about the longitudinal direction D1.

In the vicinity of the root 232 of the blade 230a, the blade wind detecting device 400a is provided and surrounds the blade 230a along its circumferential direction. When the letter "Z" denotes the distance from the tip 231 of the blade 230a to the root 232, the vicinity of the root 232 of the blade 230a may be defined, for example, as the area originating from the root 232 and spanning the distance of "0 to Z/8" toward the tip 231. Since the blade wind detecting device 400a is provided in the vicinity of the root 232 of the blade 230a, the blade wind detecting device 400a is configured to travel less upon rotation of the blade 230a following the axle rotation R2 (see FIG. 2), than in the case where the blade wind detecting device 400a is provided in any other area than the vicinity of the root 232. The present embodiment can thus reduce the influence of the axle rotation R2 on the blade wind detecting device 400a, so that the blade 230a can more accurately detect the wind acting upon the wind power generation device 200. Although FIG. 3 shows the case in which the blade wind detecting device 400a is installed near the root 232 of the blade 230a, the present embodiment is not limited to such. The blade wind detecting device 400a may be installed in any other area than the vicinity of the root 232 of the blade 230a. The blade wind detecting device 400a, however, is significantly affected by the wind caused by the rotation of the blade 230a itself if it is installed at the tip 231 of the blade 230a. The wind result in noise, which may be disadvantageously included in the measurements of the stress sensors 410A to 410L shown in FIG. 4 or cause malfunction of the stress sensors 410A to 410L.

Figure 4:
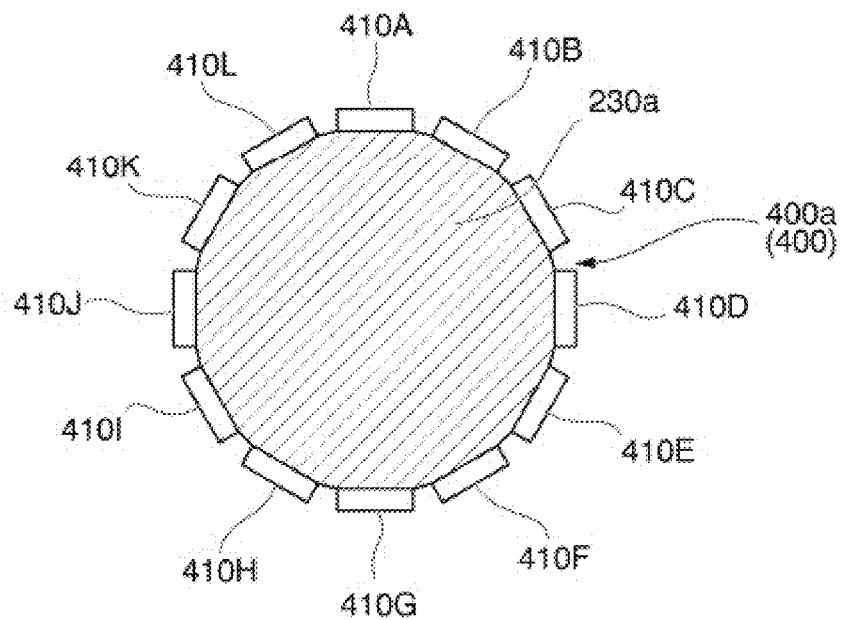
FIG. 4 is a sectional view along the line A-A in FIG. 3.

FIG. 4 is a sectional view along the line A-A in FIG. 3. The area in the vicinity of the root 232 of the blade 230a is circular in cross-section. The blade wind detecting device 400 is provided on the circumference of the circular area in the vicinity of the root 232. The blade wind detecting device 400 includes 12 stress sensors 410A, 410B, 410C, 410D, 410E, 410F, 410G, 410H, 410I, 410J, 410K and 410L for detecting an externally applied force. The stress sensors 410A to 410L are all constituted by the same sensor, for example. The stress sensors 410A to 410L each can detect stress received from the outside.

Although FIG. 4 shows the case where the twelve stress sensors 410A to 410L are provided on the blade 230a, the present embodiment is not limited to such. For example, the blade 230a may be provided with 1 to 11 stress sensors, or 13 or more stress sensors. The blade wind detecting device 400 can be manufactured with a reduced cost by reducing the number of stress sensors provided on the blade 230a. On the other hand, the speed and direction of the wind acting upon the blade 230a can be more closely monitored by increasing the number of stress sensors provided on the blade 230a.

Figure 5:
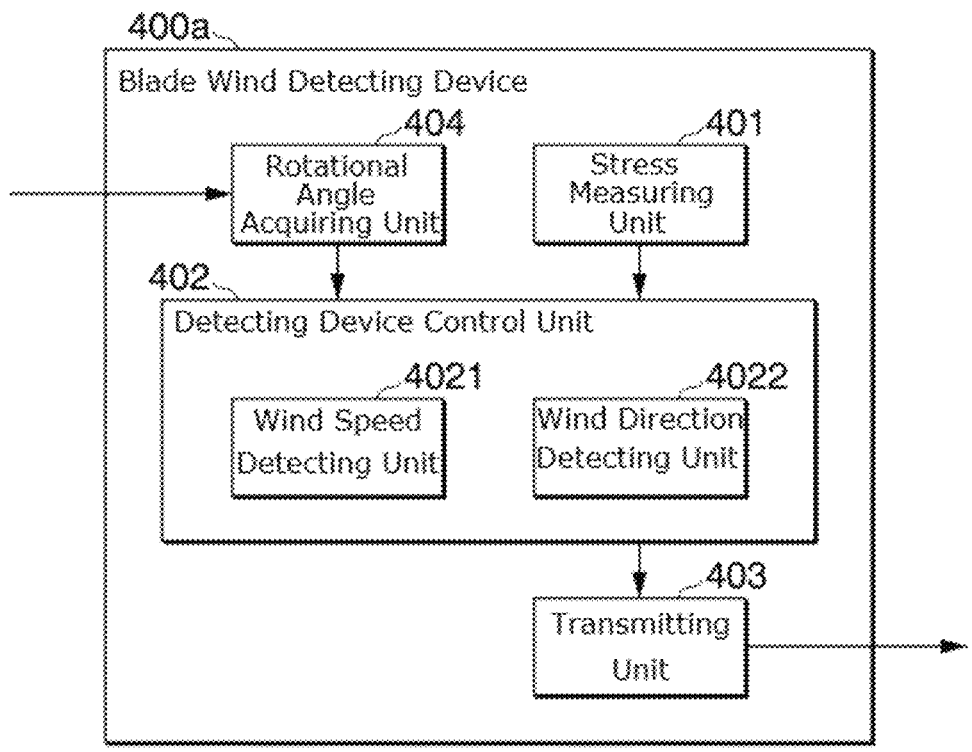
FIG. 5 is a schematic block diagram showing the configuration of a blade wind detecting device included in the wind power generation device control system according to the first embodiment of the present disclosure.

FIG. 5 is a schematic block diagram showing the configuration of the blade wind detecting device 400a included in the wind power generation device control system 100a (see FIG. 1). The blade wind detecting devices 400b and 400c are not described since they have the same configuration as the blade wind detecting device 400a. The blade wind detecting device 400a has a stress measuring unit 401, a detecting device control unit 402, a transmitting unit 403, and a rotational angle acquiring unit 404. The stress measuring unit 401 includes the twelve stress sensors 410A to 410L (see FIG. 4). The stress sensors 410A to 410L are configured to measure, at the same time, the stress received from outside, and the stress measuring unit 401 outputs the measurements to the detecting device control unit 402. The detecting device control unit 402 controls the units of the blade wind detecting device 400a. The detecting device control unit 402 is, for example, a Central Processing Unit (CPU). The detecting device control unit 402 includes a wind speed detecting unit 4021 and a wind direction detecting unit 4022. The transmitting unit 403 is constituted by a wireless transmitting device. The transmitting unit 403 performs wireless transmission with the blade control device 300a installed within the nacelle 220 to transmit the data of the wind speed output from the wind speed detecting unit 4021 and the data of the wind direction detected by the wind direction detecting unit 4022. The rotational angle acquiring unit 404 acquires the rotational angle of the rotation of the blades 230a, 230b, and 230c about the axle 250, which is caused by the wind acting upon the blades 230a, 230b and 230c. For example, when the blade 230a points to the above, right, below, and left, the rotational angle acquiring unit 404 acquires, as the rotational angle, the values 0, 90, 180, and 270 degrees, respectively.

Figure 6:
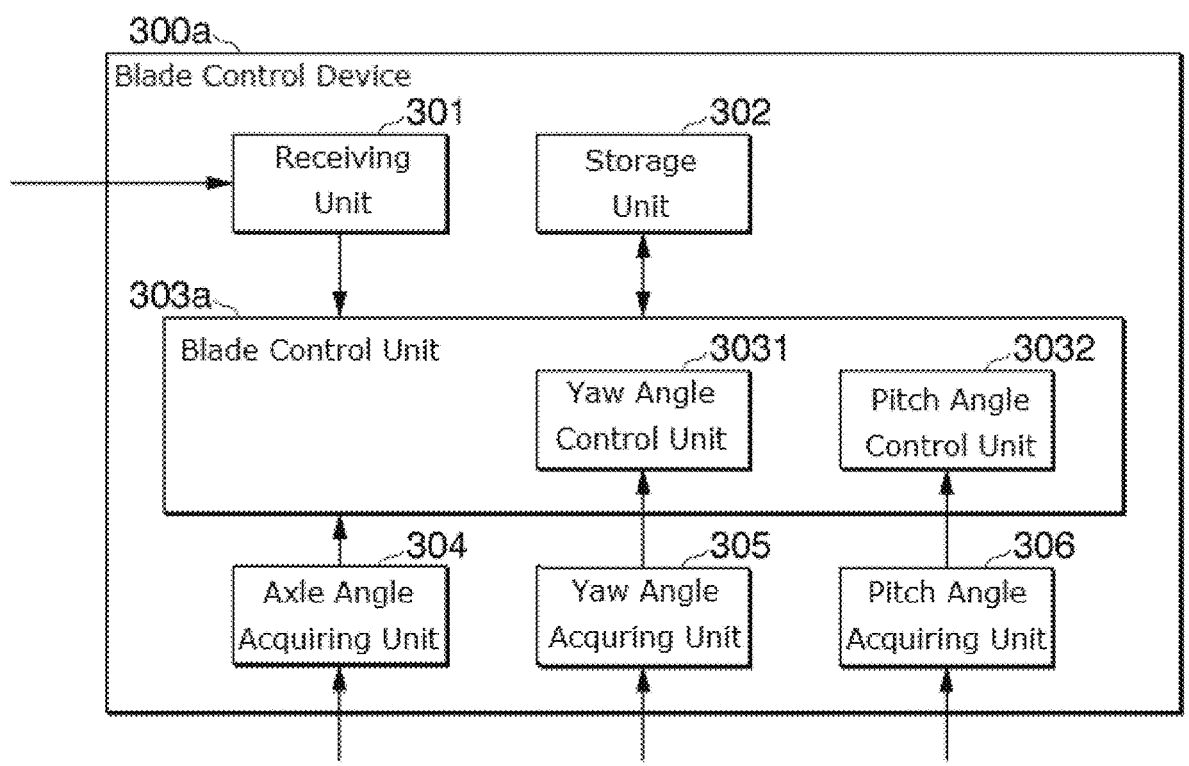
FIG. 6 is a schematic block diagram showing the configuration of a blade control device included in the wind power generation device control system according to the first embodiment of the present disclosure.

FIG. 6 is a schematic block diagram showing the configuration of the blade control device 300a included in the wind power generation device control system 100a (see FIG. 1). The blade control device 300a includes a receiving unit 301, a storage unit 302, a blade control unit 303a, an axle angle acquiring unit 304, a yaw angle acquiring unit 305, and a pitch angle acquiring unit 306. The receiving unit 301 is constituted by a wireless communication device. The receiving unit 301 receives the data regarding the wind speed and direction, which is transmitted from the transmitting unit 403 of the blade wind detecting device 400, and outputs the received data to the blade control unit 303a. The storage unit 302 is constituted by a memory. The storage unit 302 stores the data acquired by the blade control unit 303a, including the data output to the blade control unit 303a from the receiving unit 301, the data output to the blade control unit 303a from the axle angle acquiring unit 304, the data output to the blade control unit 303a from the yaw angle acquiring unit 305, and the data output to the blade control unit 303a from the pitch angle acquiring unit 306.

The blade control unit 303a controls the units of the blade control device 300a. The blade control unit 303a is constituted by a CPU. The blade control unit 303a has a yaw angle control unit 3031 and a pitch angle control unit 3032. The yaw angle control unit 3031 outputs instructions to a yaw drive device, which is provided between the tower 210 and the nacelle 220. In this way, the yaw angle control unit 3031 can control the angle of the yawing R1 (see FIG. 2) of the nacelle 220. The pitch angle control unit 3032 outputs instructions to the blades 230a, 230b, and 230c attached to the hub 240. In this manner, the pitch angle control unit 3032 controls the angle of the pitching R31, R32 and R33 (see FIG. 2) of the blades 230a, 230b, and 230c.

The axle angle acquiring unit 304 acquires data of the current rotational angle of the rotation about the axle 250 (see FIG. 2) and outputs the acquired data to the blade control unit 303a. For example, when the blade 230a shown in FIG. 1 points to the immediately above, the axle angle acquiring unit 304 outputs to the blade control unit 303a data indicating that the blade 230a is at a rotational angle of 0 degrees, the blade 230b is at a rotational angle of 120 degrees, and the blade 230c is at a rotational angle of 240 degrees.

The yaw angle acquiring unit 305 acquires data indicating which direction the nacelle 220 faces on the tower 210 and outputs the acquired data to the yaw angle control unit 3031. For example, when the power generation is taking place with the blades 230a, 230b and 230c shown in FIG. 1 facing the south, the yaw angle acquiring unit 305 outputs to the yaw angle control unit 3031 data indicating that the yaw angle indicates the south (180 degrees). Here, the yaw angle is defined as 0 degrees when the blades 230a, 230b, and 230c face the north.

The pitch angle acquiring unit 306 acquires data indicating which direction the blades 230a, 230b and 230c, which are rotatably attached to the hub 240, face relative to the hub 240 and outputs the acquired data to the pitch angle control unit 3032. For example, when the wind receiving surfaces of the blades 230a, 230b and 230c shown in FIG. 1 all face forward, the pitch angle acquiring unit 306 outputs to the pitch angle control unit 3032 data indicating that the blades 230a, 230b and 230c all have a pitch angle of 0 degrees.

Figure 7:
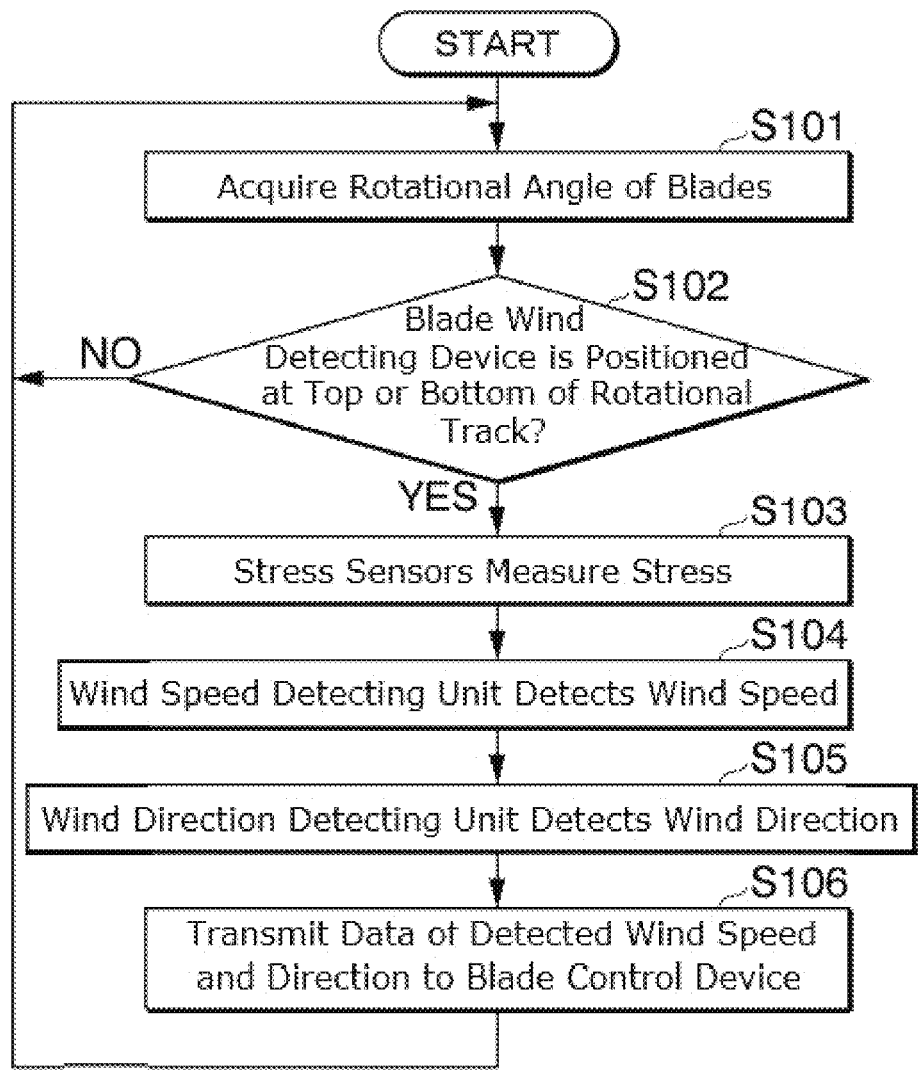
FIG. 7 is a flow chart showing operations performed by the blade wind detecting device of the wind power generation device control system according to the first embodiment of the present disclosure.

FIG. 7 is a flow chart illustrating how the blade wind detecting device 400 of the wind power generation device control system 100a (see FIG. 1) works. FIG. 7 illustrates the operations performed by the blade wind detecting device 400a attached to the blade 230a of the wind power generation device control system 100a (see FIG. 1). The blade wind detecting devices 400b and 400c attached to the other blades 230b and 230c perform the same series of operations as shown in the flow chart of FIG. 7.

To begin with, the rotational angle acquiring unit 404 acquires the rotational angle of the blade 230a having the blade wind detecting device 400a installed thereon (step S101). When the blade 230a points to the above, the acquired rotational angle is 0 degrees. When the blade 230a points to the right, the acquired rotational angle is 90 degrees. When the blade 230a points to the below, the acquired rotational angle is 180 degrees. When the blade 230a points to the left, the acquired rotational angle is 270 degrees. Next, the detecting device control unit 402 of the blade wind detecting device 400a determines whether the blade wind detection device 400a is positioned at the top or bottom of the rotational track (step S102). When the blades 230a, 230b and 230c follow the axle rotation R2 (see FIG. 2) and rotate clockwise, the position of the blade wind detecting device 400a transitions in the order of the rotational angle of 0 degrees (the blade 230a pointing to the immediately above), the rotational angle of 90 degrees (the blade 230a pointing to the right), the rotational angle of 180 degrees (the blade 230a pointing to the immediately below), the rotational angle of 270 degrees (the blade 230a pointing to the left) and the rotational angle of 0 degrees (the blade 230a pointing to the immediately above). The detecting device control unit 402 repeatedly performs the step until the blade 230a points to the immediately above (the rotational angle of 0 degrees) or the blade 230a points to the immediately below (the rotational angle of 180 degrees).

For example, the blade wind detecting device 400a may be provided with a Global Positioning System (GPS), which can be used to determine whether the blade 230a points to the immediately above (the rotational angle of 0 degrees) or the immediately below (the rotational angle of 180 degrees). In this case, the direction the blade 230a points to can be determined by referring to the GPS information to judge whether the altitude of the blade wind detecting device 400a coincides with the top or bottom point of the rotational track of the blade wind detecting device 400a. Alternatively, it may be determined whether the altitude of the blade wind detecting device 400a coincides with the top or bottom point of the rotational track of the blade wind detecting device 400a based on the instruction issued by the blade control unit 303a (the instruction issued based on the data of the rotational angle of the axle 250), which can be acquired from the axle angle acquiring unit 304 (see FIG. 6).

If the detecting device control unit 402 determines affirmatively (YES) in the step S102 (i.e., if the blade 230a points to the immediately above or below), the detecting device control unit 402 proceeds to the step S103. The detecting device control unit 402 controls the stress sensors 410A to 410L to measure the stress (step S103). Specifically, at the point of time when the blade 230a points to the immediately above and at the point of time when the blade 230a points to the immediately below, the detecting device control unit 402 simultaneously causes the stress sensors 410A to 410L to measure the stress. At the same time, the wind speed detecting unit 4021 detects the wind speed on the stress sensors 410A to 410L based on the stress measured by the stress sensors 410A to 410L (step S104). Specifically, the wind speed detecting unit 4021 stores in advance data associating the values of the stress detected by the stress sensors with the wind speed values. Based on the stored data, the wind speed detecting unit 4021 retrieves the wind speed associated with the detected stress.

To detect the wind speed on the blades 230a, 230b and 230c, the detecting device control unit 402 may statistically process the stress values detected by the respective stress sensors 410A to 410L into index values (for example, the total, average, median, or difference between the maximum and minimum values)) and compare the index values against the data stored in advance therein. For example, the wind speed detecting unit 4021 may calculate the sum of the stress values measured by the stress sensors 410A to 410L in the stress measuring unit 401. Here, the wind speed detecting unit 4021 may store in advance the total stress values and the wind speed values in association with each other. The wind speed detecting unit 4021 may thus consult the stored data to retrieve the wind speed value associated with the total of the stress values measured by the stress sensors 410A to 410L. In this way, it is no longer necessary to convert each of the measurements of the stress sensors 410A to 410L into wind speed in order to detect the wind speed. This leads to a reduced amount of operations to be performed by the blade wind detecting device 400a.

Subsequently, the wind direction detecting unit 4022 detects the wind direction at the point of time when the stress sensors 410A to 410L measure the stress (step S105). Specifically, the highest wind speed is determined from among the wind speed values detected by the wind speed detecting unit 4021 for the respective stress sensors 410A to 410L constituting the stress measuring unit 401, and the direction faced by the stress sensor corresponding to the determined highest wind speed is identified as the wind direction. As the axle 250 rotates, the directions faced by the stress sensors 410A to 410L change. Therefore, the wind direction detecting unit 4022 refers to the rotational angle obtained by the rotational angle acquiring unit 404 to detect the wind direction, which is the direction faced by the stress sensor that has measured the highest stress value. The wind direction detecting unit 4022 may obtain data indicating the stress values measured by the stress sensors 410A to 410L constituting the stress measuring unit 401 and may detect as the wind direction the direction faced by the stress sensor that has measured the largest stress value from among the obtained stress values. In this way, the wind direction can be detected without the need of detecting the wind speed. This leads to a reduced amount of operations to be performed by the blade wind detecting device 400a.

Following this, the transmitting unit 403 transmits the data regarding the wind speed and direction detected in the step S102 to the receiving unit 301 of the blade control device 300a (see FIG. 6) (step S106). Specifically, the blade control device 300a relates to each other the stress values detected by the wind speed detecting unit 4021 in the step S104, blade identification information identifying the blade (in this case, the blade 230a) for which the stress values are detected, the rotational angle of the blade 230a at the point of time when the wind speed is measured (in this case, 0 or 180 degrees) and the point of time when the wind speed is measured. The operations illustrated via the flow chart of FIG. 7 may be performed not only by the blade wind detecting device 400a attached to the blade 230a but also by the blade wind detecting devices 400b and 400c respectively attached to the blades 230b and 230c. As a result, on completion of the step S103 of the flow chart of FIG. 7, the data shown in FIG. 8 is stored.

The stress sensors 410A to 410L are attached to the blade 230a in the manner shown in FIG. 4. Here, a case is examined where the blades 230a, 230b, and 230c of the wind power generation device 200 may face the south, and the blade 230a may point to the immediately above. In this case, if the stress sensor 410A shown in FIG. 4 faces the north, the wind speed detected based on the stress measured by the stress sensor 410E is related to the wind blowing from the east. The wind speed detected based on the stress measured by the stress sensor 410J is related to the wind blowing from the west. Another case is reviewed where the blades 230a, 230b, and 230c of the wind power generation device 200 may face the south and the blade 230a may alternatively point to the immediately below. In this case, the wind speed detected based on the stress measured by the stress sensor 410E is related to the wind blowing from the west. The wind speed detected based on the stress measured by the stress sensor 410J is related to the wind blowing from the east. As described, the blade control unit 303a identifies the respective positions of the stress sensors 410A to 410L based on the rotational angle of the blades 230a, 230b 230c formed by the rotation of the axle 250. The blade control unit 303a then determines at least one of the wind direction or wind speed on the blades 230a, 230b, and 230c based on the identified positions of the stress sensors 410A to 410L.

On completion of the operations illustrated by the flow chart of FIG. 7, the data shown in FIG. 9 is obtained. According to the data shown in FIG. 9, the maximum wind speed (e.g., 10 (m/sec)) is associated with the wind speed detection time when the corresponding wind speed is detected (e.g., 0:0:0) and the wind direction (e.g., east-southeast (120 degrees)). The wind direction is expressed numerically here with the north, east, south and west being respectively represented by 0 degrees, 90 degrees, 180 degrees, and 270 degrees. The data shown in FIG. 9 can tell the maximum wind speed (m/sec) and the wind direction at a particular time (hours, minutes, seconds or 0:0:0).

Alternatively, the stress values measured by the stress sensors 410A to 410L and the directions faced by the stress sensors 410A to 410L may be transformed into vectors, from which a resultant force vector may be calculated. The direction of the resultant force vector may be determined as the wind direction. In order to accurately determine the directions faced by the stress sensors 410A to 410L, the pitch angles of the blades 230a, 230b and 230c and the rotational angle of the blades 230a, 230b and 230c may be taken into consideration.

FIG. 8 shows an example of the data obtained from the measurements of the stress sensors 410A to 410L according to the first embodiment of the present disclosure. The data shown in FIG. 8 relates to each other the blade identification information (for example, the blade 230a), the axle rotational angle (for example, 0 degrees), the stress detection time (for example, 0:0:0), and the stress values measured by the stress sensors 410A to 410L included in each of the blades 230a, 230b, and 230c (for example, 0, 0, 1, 2, 3, 2, 1, 0, 0, 0, 0, 0 (m/sec)).

The flowchart in FIG. 7 describes the case where the blade wind detecting device 400 detects the wind speed and direction when the blade wind detecting device 400 is positioned at the top or bottom of the rotational track. The wind speed and direction, however, may be detected on any other occasions than when the blade wind detecting device 400 is positioned at the top or bottom of the rotational track. It is, however, difficult to detect the wind from the east and west when the wind power generation device 200 faces the south and the blade 230a points to the east (i.e., the rotational angle of the blade 230a is 90 degrees). This is because the axis passing through the center of the annulus formed by the stress sensors 410A to 410L provided on the blade 230a extends in the east-west direction. As described with reference to the flow chart of FIG. 7, the blade wind detecting device 400a is preferably configured to measure the wind speed when the blade wind detecting device 400a is positioned at the top or bottom of the rotational track. This is because the axis passing through the center of the annulus formed by the stress sensors 410A to 410L extends perpendicularly to the ground, so that the blade wind detecting device 400a can successfully detect the wind from any of the north, south, east and west.

The flowchart in FIG. 7 describes the case where the blade wind detecting device 400 detects the wind speed and direction when the blade wind detecting device 400 is positioned at the top or bottom of the rotational track, but the present embodiment is not limited to such. For example, the blade wind detecting device 400 may be configured to detect the wind speed and direction only when the blade wind detecting device 400 is positioned at the top of the rotational track, or the blade wind detecting device 400 may be configured to detect the wind speed only when the blade wind detecting device 400 is positioned at the bottom of the rotational track. In this way, the number of operations required to calculate the wind speed and direction can be halved, which can reduce the load on the blade control device 300a.

Figure 10:
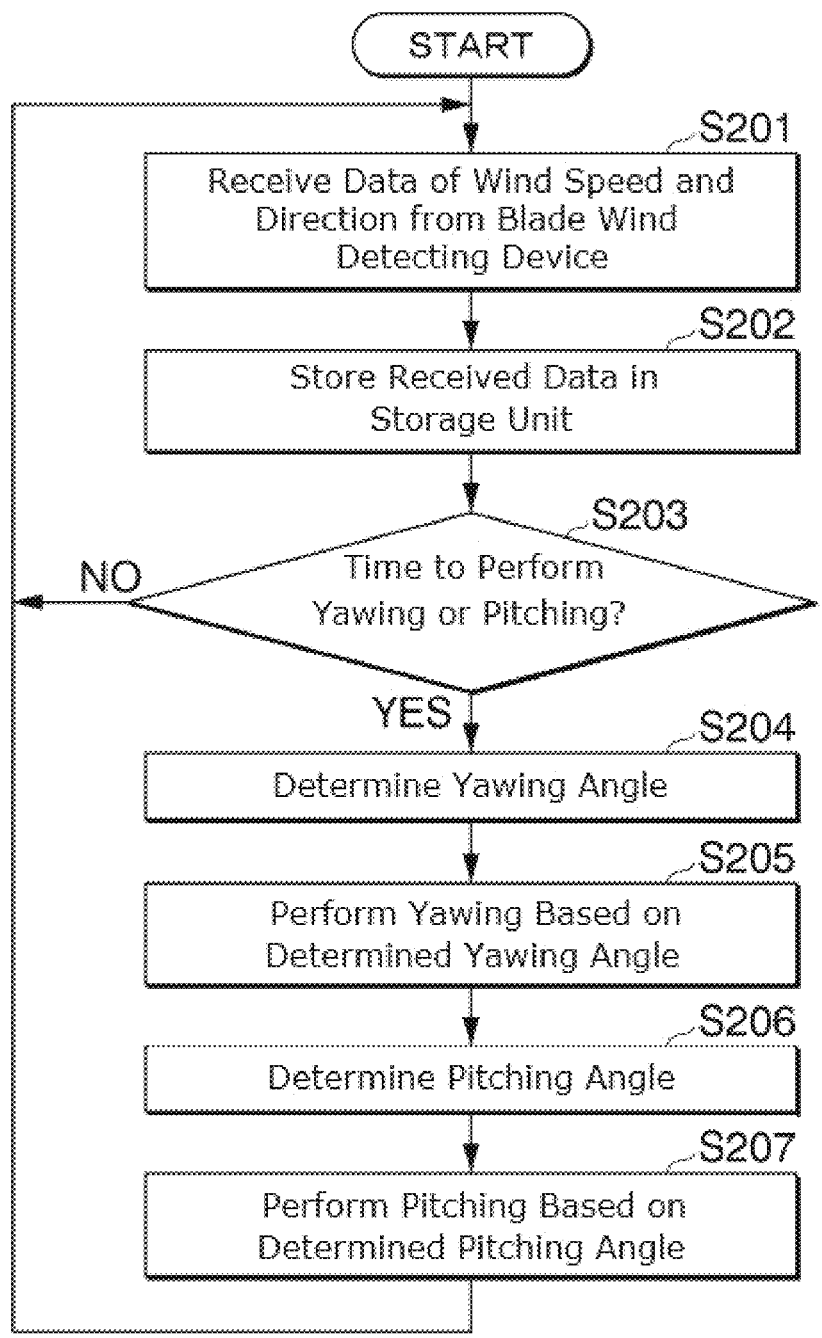
FIG. 10 is a flow chart showing operations performed by the blade control device included in the wind power generation device control system according to the first embodiment of the present disclosure.

FIG. 10 is a flow chart showing operations performed by the blade control device 300a included in the wind power generation device control system 100a (see FIG. 1) according to the first embodiment. To begin with, the blade control unit 303a of the blade control device 300a (see FIG. 6) provided in the nacelle 220 (see FIG. 1) receives the data of the wind speed and direction from the blade wind detecting device 400 via the receiving unit 301 (step S201). The blade control unit 303a stores the data of the wind speed and direction received in the step S201 in the storage unit 302 (step S202). Subsequently, the blade control unit 303a determines whether the current time is the time to control the yawing R1 (see FIG. 2) or pitching R31, R32, R33 (step S203). For example, the yawing and pitching are performed every 10 minutes. The blade control unit 303a therefore determines whether ten minutes have elapsed after the point of time when the most recent yawing control is performed in the step S203.

If it is determined that the current time is ahead of the time to control the yawing R1 (see FIG. 2), the blade control unit 303a determines negatively (NO) in the step S203 and proceeds to the step S201. On the other hand, if it is determined that the current time is the time to control the yawing R1 (see FIG. 2), the blade control unit 303a determines affirmatively (YES) in the step S203 and determines the yawing angle based on the data of the wind direction from among the data stored in the storage unit 302 (see FIG. 8) (step S204). Specifically, the yaw angle control unit 3031 determines the yawing angle such that the wind power generation device 200 can directly face the wind direction received in the step S201. Following this, the yaw angle control unit 3031 causes the nacelle 220 to yaw such that the current yaw angle, which is obtained from the yaw angle acquiring unit 305, becomes equal to the yawing angle determined in the step S204 (step S205).

After this, the pitch angle control unit 3032 determines the pitching angle based on the data of the wind speed and the like from among the data stored in the storage unit 302 (see FIG. 8) (step S206). Specifically, the pitch angle control unit 3032 determines the pitching angle based on the wind speed received in the step S201 and the rotational angle of the axle 250. More specifically, the pitch angle control unit 3032 determines and controls the pitch angle based on the wind speed and determines the pitching angle such that the rated rotational speed is maintained by feeding back the rotational speed calculated based on the axle rotational angle. Subsequently, the pitch angle control unit 3032 causes the blades 230a, 230b, and 230c to pitch such that the current pitch angle obtained from the pitch angle acquiring unit 306 becomes equal to the pitching angle determined in the step S206 (step S207).

In the first embodiment described above, the yawing R1 (see FIG. 2) is based on the wind direction on the blades 230a, 230b, and 230c, which are directly exposed to the wind, so that the blades 230a, 230b, and 230c can be controlled to directly face the wind direction to the maximum extent. In this way, the first embodiment of the present disclosure can determine more accurately the direction of the wind acting upon the wind power generation device 200 than in the conventional art, where the blades 230a, 230b and 230c rotate near the axle 250 (see FIG. 2) to disturb the wind. The nacelle wind direction detecting device provided on the nacelle 220 of the wind power generation device 200 is configured to detect the disturbed wind. As a result, the wind power generation device 200 can be controlled to face the direction where the wind speed is high. This allows the wind power generation device 200 to achieve improved power generation efficiency.

In the first embodiment described above, the pitching R31, R32, R33 (see FIG. 2) is based on the wind speed on the blades 230*a*, 230*b* and 230*c*, which are exposed to the wind. In other words, the pitch angle is controlled based on the detected wind speed such that the blades 230*a*, 230*b* and 230*c* can reach the rated operation as quickly as possible. As a result, the wind power generation device 200 can reach the rated operation more quickly than in the conventional art. This allows the wind power generation device 200 to achieve improved power generation efficiency.

In the first embodiment, the blade wind detecting devices 400*a*, 400*b* and 400*c* are respectively provided on the blades 230*a*, 230*b* and 230*c*, and the data of the wind direction detected by the blade wind detecting devices 400*a*, 400*b* and 400*c* is transmitted to the blade control device 300*a* via wireless communication. The present embodiment, however, is not limited to such. For example, one of the blades 230*a*, 230*b* and 230*c* may be provided with a weathervane, and a camera or other imaging device may be provided on the nacelle 220. The imaging device may be used to capture images of the weathervane on one of the blades 230*a*, 230*b* and 230*c*, and the images are used to detect the wind direction on the blades. This implementation eliminates the need of providing the receiving unit 301 of the blade control device 300*a* in the first embodiment. As a result, the blade control device 300*a* can have more simplified configuration.

According to the above description, the pitching is performed in the step S207 of the flowchart shown in FIG. 10. In a case where the wind power generation device 200 does not performing pitch control, the steps S206 and S207 of the flow chart of FIG. 10 are no longer necessary.

According to the flowchart in FIG. 10, the operation relating to the yawing (steps S204 and S205) is followed by the operation relating to the pitching (steps S206 and S207), but the present embodiment is not limited to such. For example, the operation relating to the pitching may be followed by the operation relating to the yawing. The operation relating to the yawing and the operation relating to the pitching may be performed simultaneously. The operation relating to the yawing and the operation relating to the pitching may be performed independently.

According to the first embodiment, the blade wind detecting devices 400*a*, 400*b* and 400*c* each have the stress measuring unit 401, detecting device control unit 402, transmitting unit 403, and rotational angle acquiring unit 404. The present embodiment, however, is not limited to such. As an alternative example, the blade wind detecting devices 400*a*, 400*b* and 400*c* may need only the stress measuring unit 401 and transmitting unit 403, and the other units may be included in the blade control device 300*a* or an external device. In this case, the wind speed on the blades 230*a*, 230*b* and 230*c* may be detected by a device other than the blade wind detecting devices 400*a*, 400*b* and 400*c*. This also applies to the subsequent embodiments.

Second Embodiment

Figure 11:
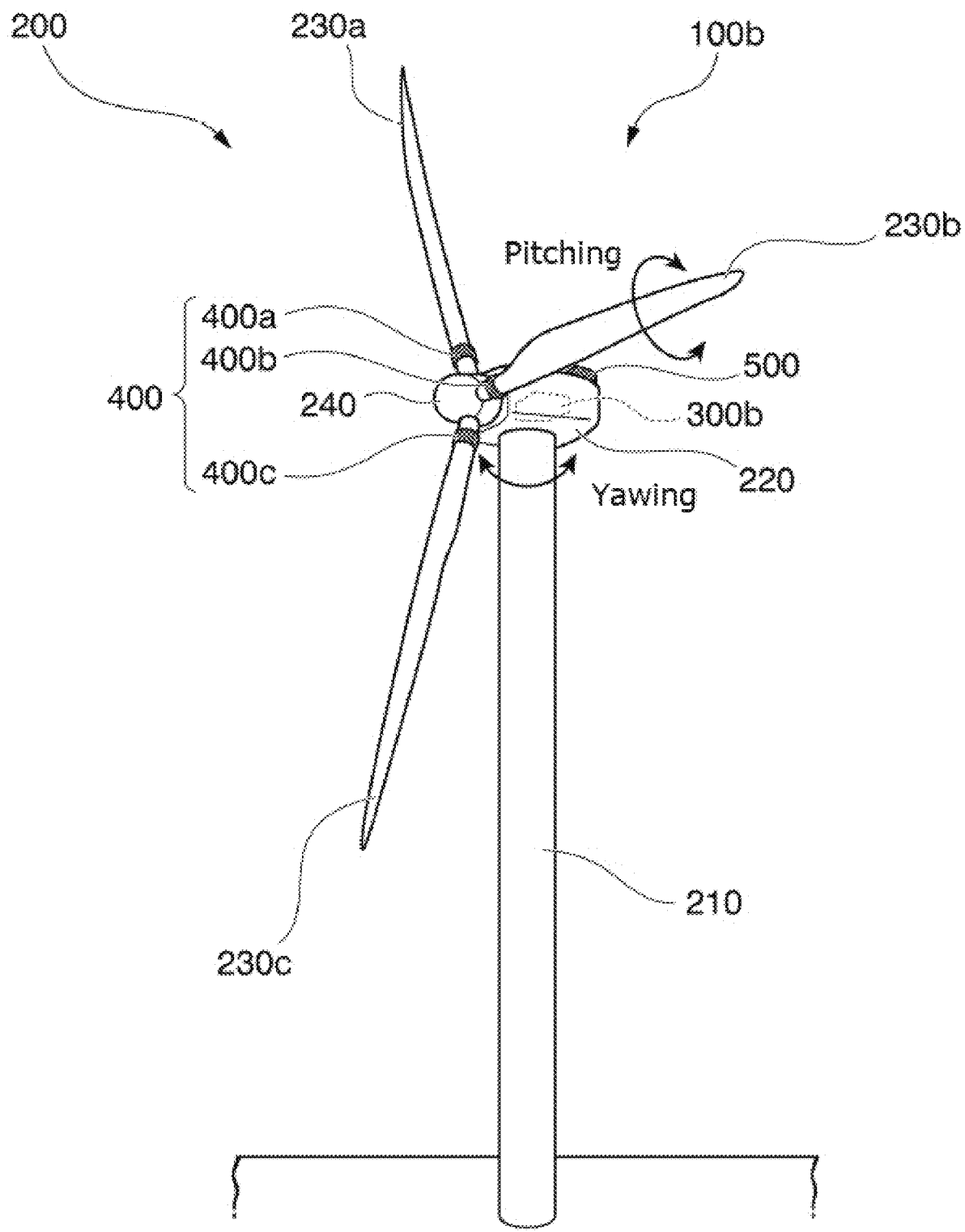
FIG. 11 is a perspective view showing an example of a wind power generation device control system according to a second embodiment of the present disclosure.

FIG. 11 is a perspective view showing an example of a wind power generation device control system 100*b* according to a second embodiment of the present disclosure. The wind power generation device control system 100*b* relating to the second embodiment differs from the wind power generation device control system 100*a* relating to the first embodiment (see FIG. 1) in that a nacelle wind direction detecting device 500 is provided and a blade control device 300*b* is provided in place of the blade control device 300*a*. The other units of the wind power generation device control system 100*b* (see FIG. 11) relating to the second embodiment are the same as the corresponding units of the wind power generation device control system 100*a* (see FIG. 1) relating to the first embodiment. These units are assigned with the same reference numerals as in the first embodiment and thus not described here. As shown in FIG. 11, the nacelle wind direction detecting device 500 is, for example, a cup-shaped wind direction detecting device. The nacelle wind direction detecting device 500 is located within the area above the nacelle 220 and away from the blades 230*a*, 230*b* and 230*c*. The wind direction detected by the nacelle wind direction detecting device 500 is transmitted to the blade control device 300*b* in the nacelle 220 via wired or wireless communication.

Figure 12:
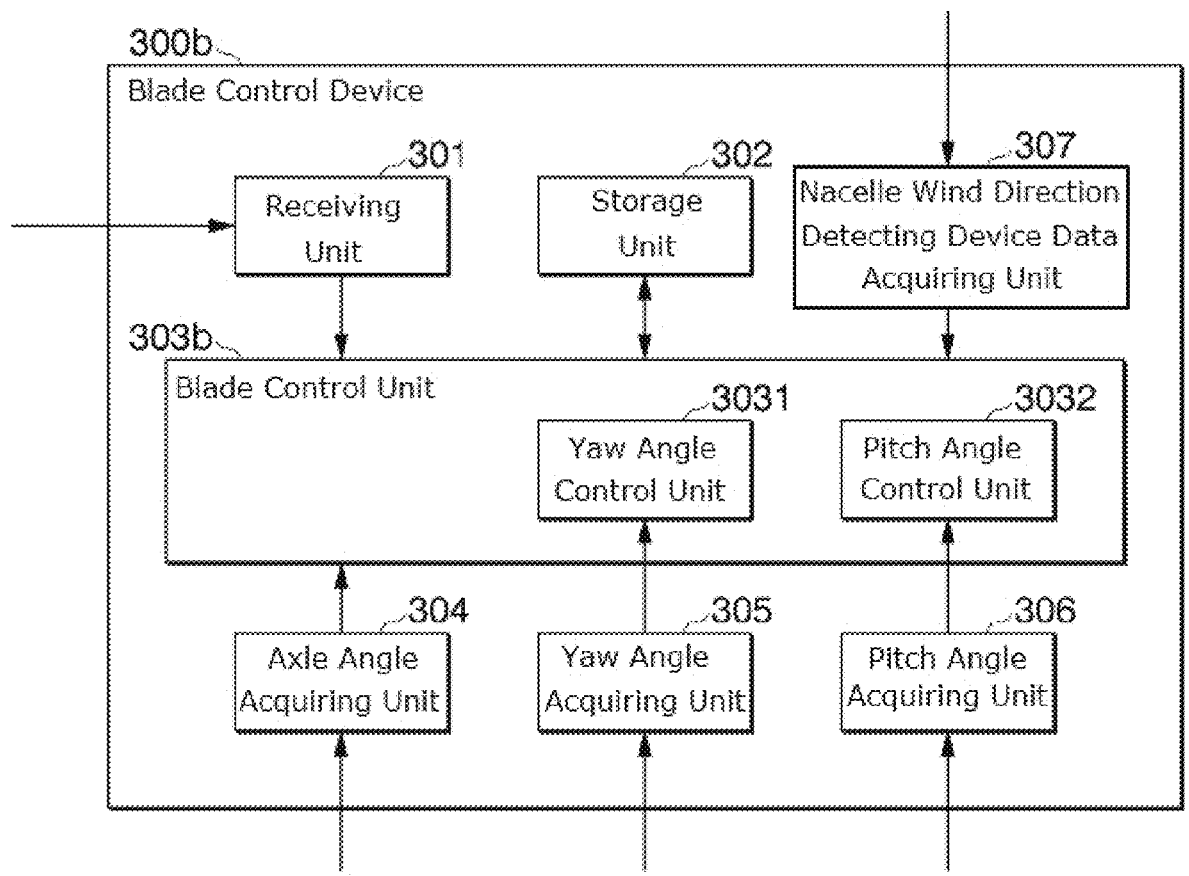
FIG. 12 is a schematic block diagram showing the configuration of a blade control device included in the wind power generation device control system according to the second embodiment of the present disclosure.

FIG. 12 is a schematic block diagram showing the configuration of the blade control device 300*b* included in the wind power generation device control system 100*b* (see FIG. 11). The blade control device 300*b* relating to the second embodiment differs from the blade control device 300*a* relating to the first embodiment (see FIG. 6) in that a nacelle wind direction detecting device data acquiring unit 307 is provided and a blade control unit 303*b* is provided in place of the blade control unit 303*a*. The other units of the blade control device 300*b* relating to the second embodiment (see FIG. 12) are the same as the corresponding units of the blade control device 300*a* relating to the first embodiment (see FIG. 6). These units are assigned with the same reference numerals as in the first embodiment and thus not described here. The nacelle wind direction detecting device data acquiring unit 307 shown in FIG. 12 receives data of the wind direction detected by the nacelle wind direction detecting device 500 from the nacelle wind direction detecting device 500, which is provided on the nacelle 220. The blade control unit 303*b* is constituted by a CPU and the like. The blade control unit 303*b* uses the data of the wind direction output from the nacelle wind direction detecting device data acquiring unit 307 to perform operations shown in FIG. 13.

Figure 13:
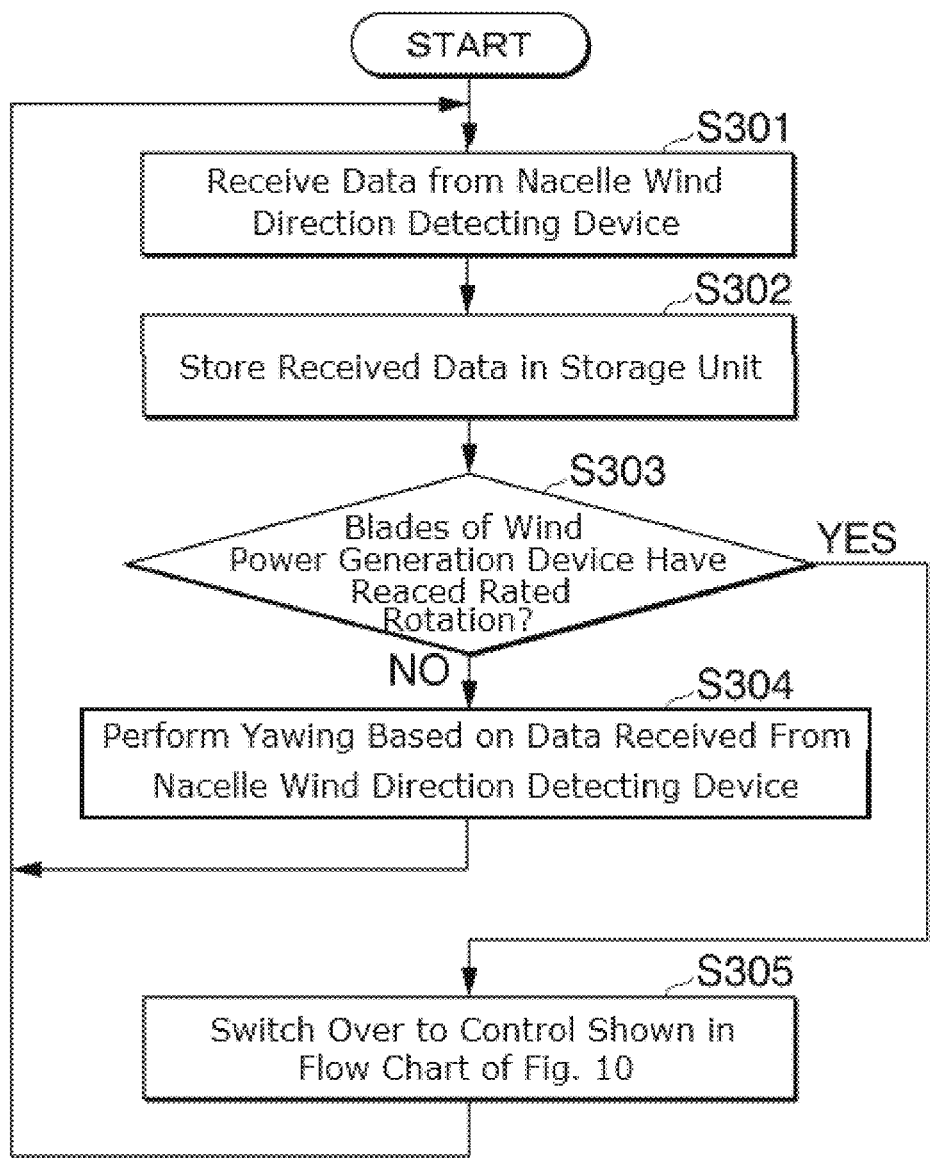
FIG. 13 is a flow chart showing operations performed by the blade control device included in the wind power generation device control system according to the second embodiment of the present disclosure.

FIG. 13 is a flow chart illustrating the operations performed by the blade control device 300*b* of the wind power generation device control system 100*b* (see FIG. 11). To begin with, the blade control unit 303*b* receives the data of the wind direction detected by the nacelle wind direction detecting device 500 from the nacelle wind direction detecting device 500, which is provided on the nacelle 220 (step S301). Subsequently, the blade control unit 303*b* stores in the storage unit 302 the data of the wind direction received in the step S301 from the nacelle wind direction detecting device 500 via the nacelle wind direction detecting device data acquiring unit 307 (step S302). Following this, the blade control unit 303*b* determines whether the rotation speed of the blades 230*a*, 230*b* and 230*c* of the wind power generation device 200 has reached the rated rotation speed (step S303). For example, the blade control unit 303*b* determines whether the rotation speed of the axle rotation R2 (see FIG. 2) of the blades 230*a*, 230*b* and 230*c* has reached the rated rotation speed N (e.g., 6 (rev/min)).

If the rotation speed of the axle rotation R2 (see FIG. 2) of the blades 230*a*, 230*b* and 230*c* has not reached the rated rotation speed N, the blade control unit 303*b* judges negatively (NO) in the step S303 and performs the yawing R1 (see FIG. 2) based on the data of the wind direction received from the nacelle wind direction detecting device 500 in the step S301 (step S304). For example, if the direction currently faced by the blades 230*a*, 230*b* and 230*c* of the wind power generation device 200 does not coincide with the wind direction received from the nacelle wind direction detecting device 500 in the step S301, the yaw angle control unit 3031 of the blade control unit 303*b* performs the yawing R1 (see FIG. 2) such that the direction currently faced by the blades 230*a*, 230*b* and 230*c* coincides with the wind direction received from the nacelle wind direction detecting device 500 in the step S301.

If the rotation speed of the axle rotation R2 (see FIG. 2) of the blades 230*a*, 230*b* and 230*c* has reached the rated rotation speed N, the blade control unit 303*b* judges affirmatively (YES) in the step S303, and the blade control unit 303*b* starts the series of steps described in the flow chart shown in FIG. 10, instead of the series of steps described in the flow chart shown in FIG. 13 (step S305).

Figure 14:
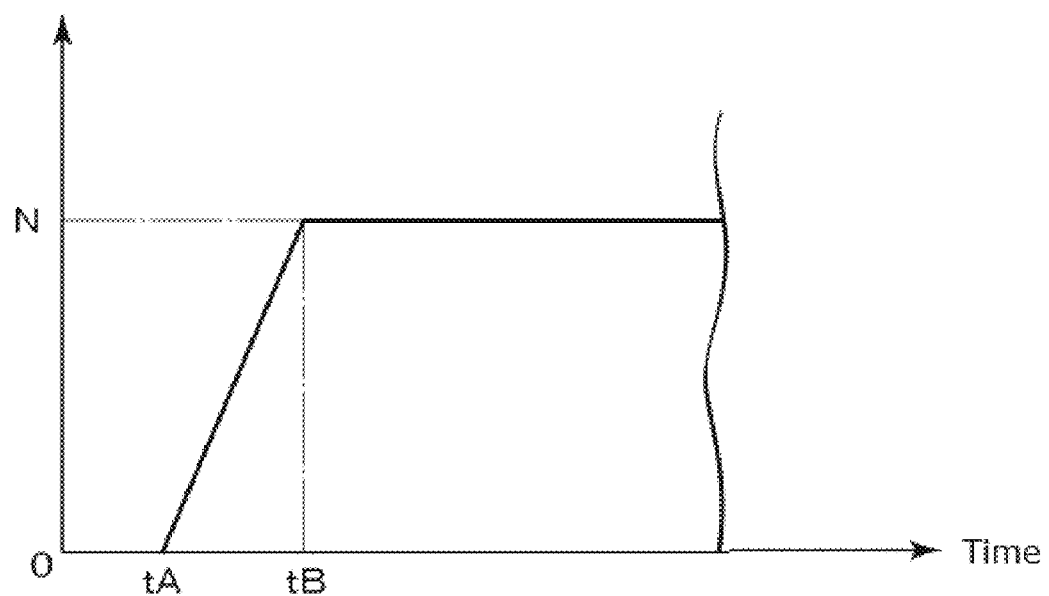
FIG. 14 is a graph illustrating how the wind power generation device control system according to the second embodiment of the present disclosure works.

FIG. 14 is a graph showing how the wind power generation device control system 100*b* works. In FIG. 14, the horizontal axis represents the time, and the vertical axis represents the rotation speed of the blades 230*a*, 230*b* and 230*c* achieved by the axle rotation R2 (see FIG. 2). FIG. 14 indicates that the blades 230*a*, 230*b* and 230*c* of the wind power generation device 200 of the wind power generation device control system 100*b* (see FIG. 11) start the axle rotation R2 (see FIG. 2) at a point of time $t_A$. The rotation speed of the axle rotation R2 (see FIG. 2) of the blades 230*a*, 230*b* and 230*c* then reaches the rated rotation speed N at a point of time $t_B$. In the period from the point of time $t_A$ to the point of time $t_B$, the series of steps described in the flow chart shown in FIG. 13 is performed. The rotation speed of the axle rotation R2 (see FIG. 2) of the blades 230*a*, 230*b* and, 230*c* reaches the rated rotation speed N at the point of time U. After the point of time $t_B$, the series of steps shown in the flow chart of FIG. 10 is performed in place of the series of steps shown in the flow chart of FIG. 13.

In the second embodiment, in the period from the point of time $t_A$ to the point of time $t_B$, the wind power generation device 200 of the wind power generation device control system 100*b* does not generate a sufficient amount of power. During this period, the wind direction is detected based on the single nacelle wind direction detecting device 500 (see FIG. 11), which is located behind the blades 230*a*, 230*b* and 230*c*. On the other hand, after the point of time $t_B$, the wind power generation device 200 of the wind power generation device control system 100*b* generates a sufficient amount of power. After the point of time $t_B$, the wind direction is detected based on the data acquired by the blade wind detecting devices 400 installed on the blades 230*a*, 230*b* and 230*c*. Therefore, the blade control device 300*b* relating to the second embodiment can detect the wind direction more accurately after the amount of power generated by the wind power generation device 200 reaches a sufficient level than before the amount of power generated by the wind power generation device 200 reaches the sufficient level. Since the blade control device 300*b* is used to control the yaw angle and other factors, the second embodiment can reduce the processing load for the wind direction detection before the amount of power generated by the wind power generation device 200 reaches a sufficient level.

According to the above description, if the rotation speed of the blades 230*a*, 230*b* and 230*c* of the wind power generation device 200 reaches their rated rotation speed in the step S303 of the flow chart shown in FIG. 13, the series of operations shown in the flow chart of FIG. 10 is started. The present embodiment, however, is not limited to such. For example, the series of operations shown in the flow chart of FIG. 10 may be performed while the blades 230*a*, 230*b* and 230*c* of the wind power generation device 200 keeps their rated rotation. The wind power generation device 200 may reach the rated rotation but later leave the rated rotation. In this case, the series of steps shown in the flow chart of FIG. 13 may be performed instead of the series of steps shown in the flow chart of FIG. 10. This can reduce the operations required for the yawing. In the step S304 of the flow chart shown in FIG. 13, the yaw angle is controlled. The second embodiment, however, is not limited to such. In place of the yaw angle, the pitch angle may be controlled, and the yaw and pitch angles. may be both controlled.

Third Embodiment

The following describes a wind power generation device control system according to a third embodiment of the present disclosure. The wind power generation device control system relating to the third embodiment has the same configuration as the wind power generation device control system 100*a* (see FIG. 1) relating to the first embodiment. The wind power generation device control system relating to the third embodiment is thus not described in detail, and only the differences are described.

Figure 15:
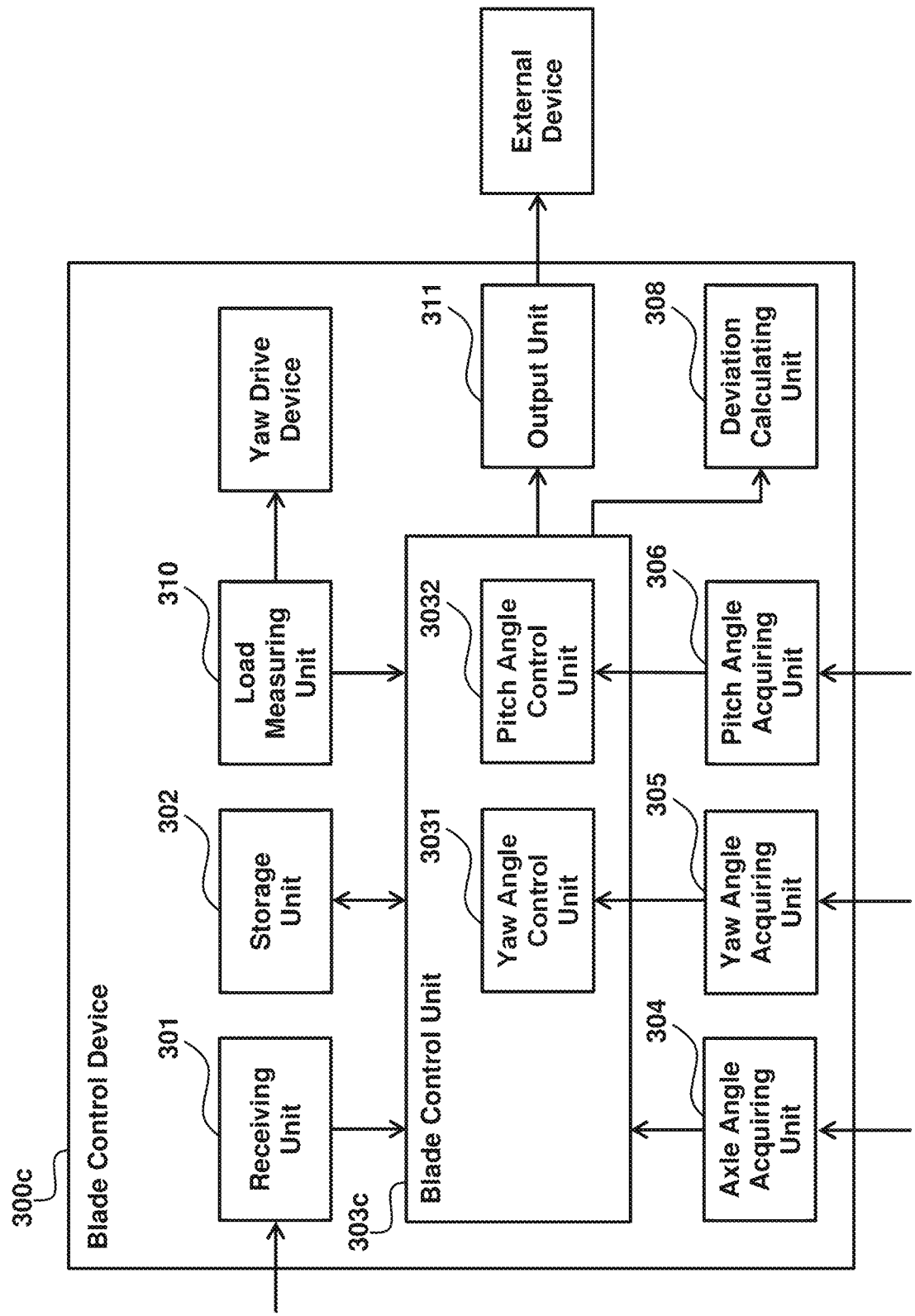
FIG. 15 is a schematic block diagram showing the configuration of a blade control device included in a wind power generation device control system according to a third embodiment of the present disclosure.

FIG. 15 is a schematic block diagram showing the configuration of a blade control device 300*c* included in a wind power generation device control system relating to a third embodiment. The blade control device 300*c* relating to the third embodiment differs from the blade control device 300*a* relating to the first embodiment (see FIG. 6) in that a deviation calculating unit 308, a load measuring unit 310 (referred to as the load detecting device), and an output unit 311 (referred to as the output device) are provided and the blade control unit 303*c* is provided in place of the blade control unit 303*a*. The other units of the blade control device 300*c* (see FIG. 15) relating to the third embodiment are the same as the corresponding units of the blade control device 300*a* (see FIG. 6) relating to the first embodiment. These units are assigned with the same reference numerals as in the first embodiment and thus not described here.

A yaw drive device, which is not shown, rotates the nacelle 220 with respect to the tower 210, so that the blades 230*a*, 230*b*, and 230*c* may yaw. The deviation calculating unit 308 calculates a wind direction deviation indicating a change in the wind direction observed over a predetermined period of time (for example, three seconds). The wind direction deviation is large if the wind direction significantly changes over the predetermined period of time (for example, the wind direction changes by 90 degrees or more). On the other hand, if the wind direction does not change significantly over the predetermined period of time, the wind direction deviation is small. The load measuring unit 310 is, for example, a bolt strain sensor or a torque sensor. The bolt strain sensor is a sensor shaped like a bolt and configured to determine how much load is applied. The bolt strain sensor has a sensor included in the bolt for detecting strain. The bolt strain sensor is used to secure the yaw drive device to the wind power generation device 200. In this way, the bolt strain sensor can determine how much load is applied to the yaw drive device during yawing. The torque sensor is configured to measure the force (torque) applied to the axis of rotation in the direction of rotation. The torque sensor is installed in, for example, a shaft provided for the yawing. The load measuring unit 310 detects yaw load applied to the yaw drive device for yawing (R1, see FIG. 2) the nacelle 220 on the tower 210. Under control of the blade control unit 303*c*, the output unit 311 transmits predetermined data from among the data stored in the storage unit 302 to an external device. The external device is a storage device, which is not shown, in the blade control device 300c or a cloud server outside the wind power generation device control system. The blade control unit 303c is constituted by a CPU and the like. The blade control unit 303c uses the data of the load, which is output from the load measuring unit 310, to perform operations shown in FIG. 16.

Figure 16:
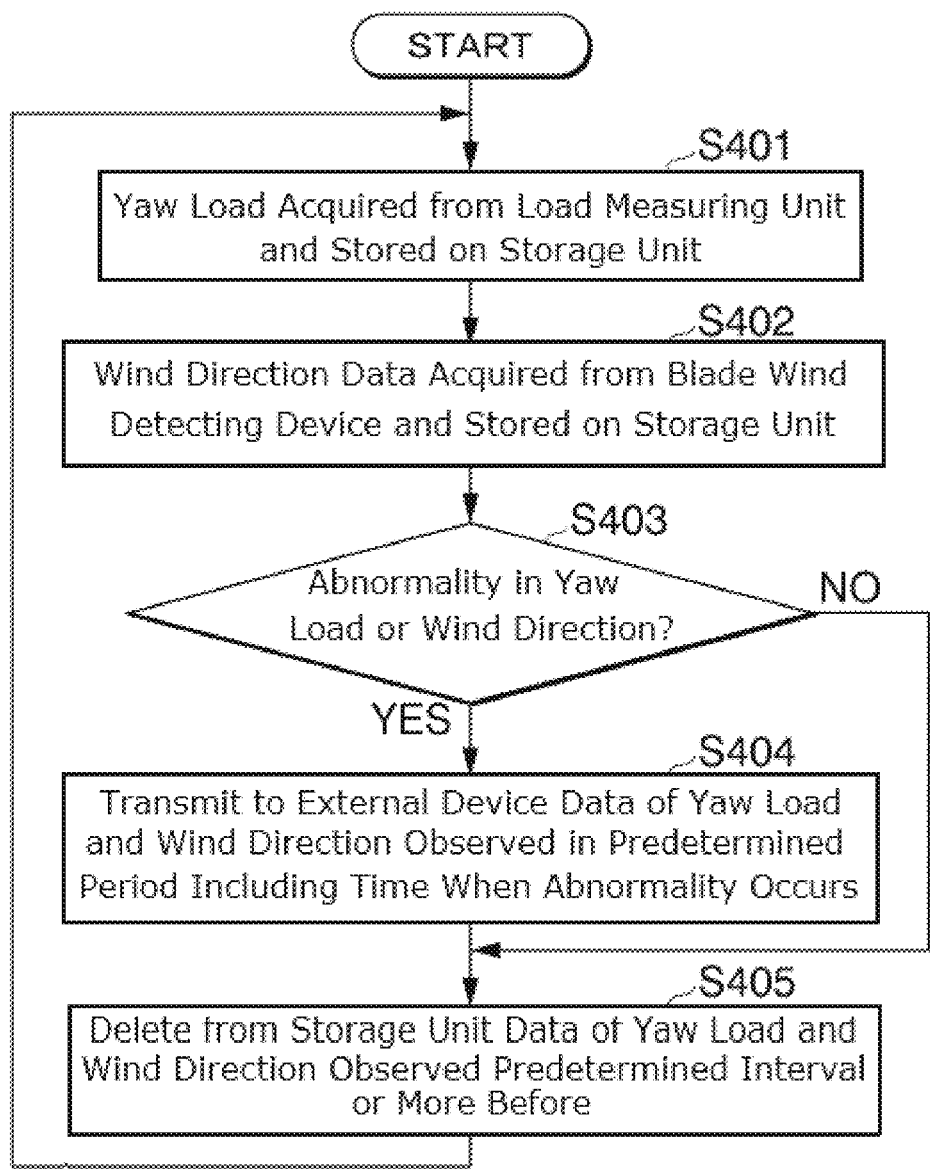
FIG. 16 is a flow chart showing operations performed by the blade control device included in the wind power generation device control system according to the third embodiment of the present disclosure.

FIG. 16 is a flow chart showing how the blade control device 300c (see FIG. 15) operates. To begin with, the blade control unit 303c acquires from the load measuring unit 310 the yaw load applied to the yaw drive device, which is configured to yaw (R1, see FIG. 2) the nacelle 220 on the tower 210, and stores the acquired data in the storage unit 302 (step S401). The deviation calculating unit 308 acquires from the blade wind detecting device 400 (see FIG. 1) the data of the wind direction, generates data of wind direction deviation from the acquired wind direction data, and stores the generated data in the storage unit 302 (step S402).

Subsequently, the blade control unit 303c determines whether or not an abnormality occurs in at least one of (i) the yaw load acquired from the load measuring unit 310 in the step S401 or (ii) the wind direction deviation generated in the step S402 (step S403). If an abnormality occurs in at least one of the yaw load acquired in the step S401 or the wind direction deviation generated in the step S402, the blade control unit 303c judges affirmatively (YES) in the step S403. In addition, the blade control unit 303c generates data indicating the yaw load, wind direction, and wind direction deviation observed over a predetermined period of time preceding and following the point of time when the abnormality occurs in association with the times when the respective data values are detected, and transmits the data to an external device via the output unit 311 (step S404). Following this, the blade control unit 303c performs the step S405. In the step S404, the blade control unit 303c may not transmit all of the data values indicating the yaw load, wind direction, and wind direction deviation, but at least some of them to the external device.

For example, if the yaw load acquired in the step S401 exceeds a predetermined yaw load threshold, the blade control unit 303c generates data indicating the yaw load, wind direction, and wind direction deviation observed over a period from a point of time a predetermined interval (for example, 20 seconds) prior to the point of time when the predetermined yaw load threshold is exceeded to a point of time a predetermined interval (for example, 20 seconds) subsequent to the point of time when the predetermined yaw load threshold is exceeded, and transmits the data to the external device. Alternatively, if the wind direction deviation generated in the step S402 exceeds a predetermined wind direction deviation threshold, the blade control unit 303c generates data indicating the yaw load, wind direction, and wind direction deviation observed over a period from a point of time a predetermined interval (for example, 20 seconds) prior to the point of time when the predetermined wind direction deviation threshold is exceeded to a point of time a predetermined interval (for example, 20 seconds) subsequent to the point of time when the predetermined wind direction deviation threshold is exceeded, and transmits the data to the external device.

After this, the blade control unit 303c deletes from the storage unit 302 the data detected at the points of time a predetermined interval (for example, 20 seconds) or more prior to the point of time when the yaw load or wind direction deviation experiences the abnormality (step S405). In this way, the data detected at the points of time around the period in which the abnormality occurs can be transmitted to the external device and kept. On the other hand, the data that has nothing to do with the abnormality and does not need to be examined is deleted. This results in reducing the amount of data stored in the storage unit 302 of the blade control unit 303c. Following this, the blade control unit 303c performs the step S401. In the step S405, the blade control unit 303c may not entirely delete the data related to the yaw load, wind direction and wind direction deviation stored in the storage unit 302 but delete at least some of the data, specifically, the data detected at the points of time a predetermined interval (for example, 20 seconds) or more prior to the point of time when the abnormality occurs.

Figure 17:
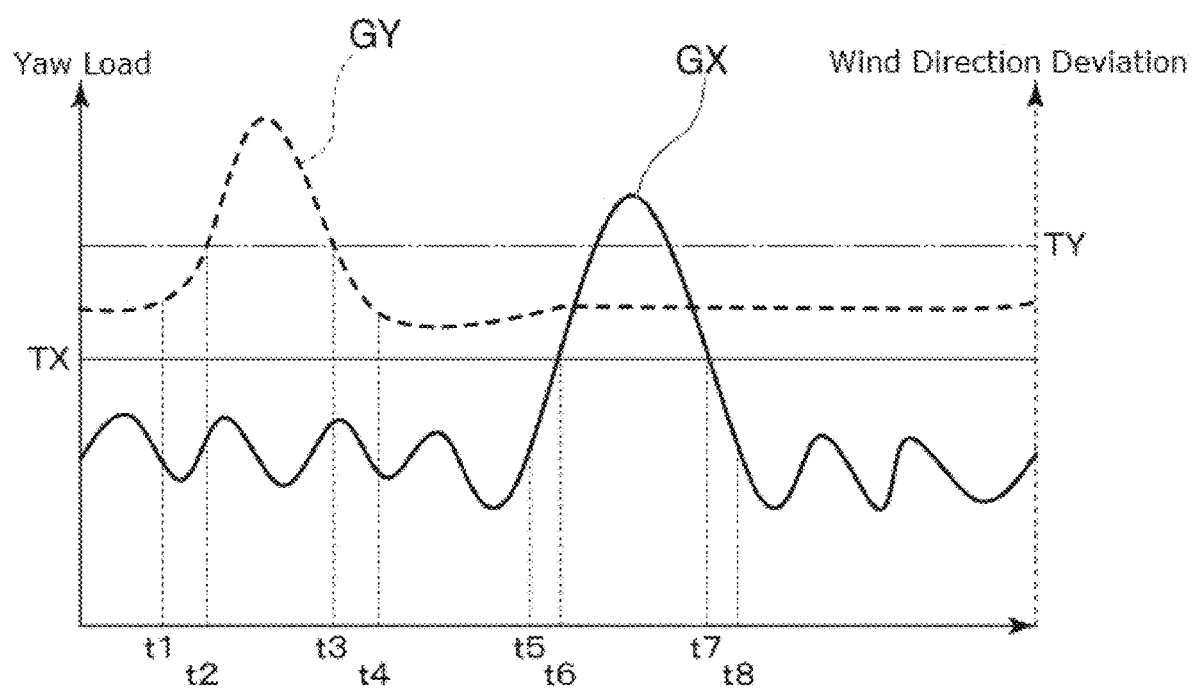
FIG. 17 is a graph illustrating the operations performed by the wind power generation device control system according to the third embodiment of the present disclosure.

FIG. 17 is a graph illustrating the operations performed by the wind power generation device control system according to the third embodiment of the present disclosure. In FIG. 17, the horizontal axis represents the time, the left vertical axis represents the yaw load, and the right vertical axis represents the wind direction deviation. In FIG. 17, TX denotes the yaw load threshold, and TY represents the wind deviation threshold. The graph GX shows how the yaw load changes over time. The graph GY shows how the wind direction deviation changes over time.

Referring to the graph shown in FIG. 17, the wind direction deviation is above the wind direction deviation threshold TY in the period from the point of time t2 to the point of time t3. Therefore, the data of the yaw load and the data of wind direction deviation detected at the points of time in the period from the point of time t1, which is the predetermined interval (for example, 20 seconds) prior to the point of time t2, to the point of time t4, which is the predetermined interval (for example, 20 seconds) subsequent to the point of time t3, are transmitted to the external device such as a cloud server. Referring further to the graph shown in FIG. 17, the yaw load is above the yaw load threshold TX in the period from the point of time t6 to the point of time t7. Therefore, the data of the yaw load and the data of the wind direction deviation detected at the points of time in the period from the point of time t5, which is the predetermined interval (for example, 20 seconds) prior to the point of time t6, to the point of time t8, which is the predetermined interval (for example, 20 seconds) subsequent to the point of time t7, are transmitted to the external device such as a cloud server.

In the above-described manner, if an abnormality occurs, specifically, the yaw load exceeds the yaw load threshold TX or the wind direction deviation exceeds the wind direction deviation threshold TY, the data of the yaw load and wind direction deviation detected in the time ranges t1 to t4 and t5 to t8 respectively including the time ranges t2 to t3 and t6 to t7 in which the abnormality occurs is transmitted to the external device. As a result, the user can analyze the situation by comparing and studying the data of the yaw load and the data of the wind direction deviation that are received by the external device, where one of the yaw load and the wind direction deviation experiences abnormalities and the other does not.

If the wind direction deviation is large (i.e., the wind direction changes abruptly), this suggests large load being put on the yaw drive device located between the tower 210 and the nacelle 220, thereby causing the wind power generation device 200 to fail. In the third embodiment, the relationship between the yaw load and the wind direction deviation can be examined. In the third embodiment, the results of the examination can be referred to in order to determine whether a new wind power generation device 200 can be installed near the current wind power generation device 200 or at a different site.

In the step S404 of the flow chart shown in FIG. 16, if either the yaw load or wind direction deviation experiences an abnormality, the blade control unit 303c transmits to the external device the data of the yaw load and the data of the wind direction deviation detected at the points of time around the time range in which the abnormality occurs. The present embodiment, however, is not limited to this. For example, if the yaw load experiences an abnormality, the data of the wind direction deviation, which experiences no abnormality, may be transmitted to the external device. If the wind direction deviation experiences an abnormality, the data of the yaw load, which experiences no abnormality, may be transmitted to the external device. This can reduce the amount of data to be transmitted from the blade control device 300c to the external device. In the period during which one of the yaw load and the wind direction deviation experiences an abnormality, the user of the external device can acquire and analyze the data of the other of the yaw load and the wind direction deviation that experiences no abnormality.

Fourth Embodiment

The following now describes a fourth embodiment of the present disclosure. In the fourth embodiment, the yaw drive device includes a motor for feeding a driving force to adjust the yaw angle of the blades 230a, 230b and 230c and a braking mechanism for performing braking by stopping the driving force fed from the motor. The blades 230a, 230b and 230c each have one stress sensor. The fourth embodiment further provides a release unit for stopping the driving force output from the motor, which is configured to adjust the yaw angle of the blades 230a, 230b and 230c through rotation and releasing the braking applied by the braking mechanism based on the measurements provided by the stress sensors. If the stress measured by the stress sensors on the blades 230a, 230b and 230c exceeds a threshold value, the release unit prevents the motor from outputting the driving force and releases the braking of the rotation applied by the braking mechanism. In other words, free yaw control is in place. The free yaw control permits free relative rotation between the nacelle 220 and the tower 210, and reduces or eliminates the braking force and drive force that may intervene the free relative rotation between the nacelle 220 and the tower 210. The braking of the rotation may be released by controlling the power fed to the motor such that no braking force is applied from the motor brake unit to the motor drive unit. For example, an external force such as a wind gust may be applied. In this case, an extremely large load might be applied on the gear meshing between the motor and the blades if the braking mechanism applies a braking force to restrict the rotation of the blades. To address this issue, if the stress sensors on the blades detect an abnormality, the release unit may release the braking of the rotation by the braking mechanism of the drive device. This can not only prevent an increase in load on the meshing but also release the load at the meshing.

A computer readable storage medium may store thereon programs for realizing the functions of the units of the blade wind detecting device 400 (see FIG. 5), blade control device 300a (see FIG. 6), blade control device 300b (see FIG. 12), and blade control device 300c (see FIG. 15). The programs stored on the storage medium may be loaded onto a computer system and then executed, so that the respective units shown in FIGS. 5, 6, 12 and 15 may operate. The term "computer system" as used herein encompasses hardware such as OS and peripheral devices. The term "computer system" may also encompass WWW systems with homepage provision environment (or display environment). The term "computer-readable storage medium" refers to a storage device such as portable medium including a flexible disc, a magneto-optical disc, a ROM, and a CD-ROM, and a hard disk built-in to the computer system. Further, the term "computer-readable storage medium" includes storage that retain the program for some period of time, like a volatile memory (for example, RAM) in a computer system that operates as a server or a client receiving the program through a network such as the Internet or a communication line such as a telephone line.

What is claimed is:

1. A wind power generation device control system comprising:
   a blade wind detecting device for detecting at least one of a wind direction or a wind speed on at least one blade of a wind power generation device; and
   a blade control device for controlling at least one of (i) a pitch angle of the at least one blade or (ii) a yaw angle of the wind power generation device, based on at least one of the wind direction or the wind speed detected by the blade wind detecting device,
   wherein the blade wind detecting device includes:
     a plurality of stress sensors provided along a circumferential direction on the at least one blade, and are configured to measure the stress to which the at least one blade is received from outside at the same time;
     a detecting device control unit for detecting the wind speed based on the stress measured by the plurality of stress sensors at the same time, and detecting the wind direction at the point of time when the plurality of stress sensors measure the stress, and
     a transmitting unit provided on the at least one blade, the transmitting unit being configured to wirelessly transmit a data regarding the detected wind speed and the wind direction to the blade control device.

2. The wind power generation device control system of claim 1, wherein the detecting device control unit includes a pitch angle acquiring unit for acquiring a pitch angle of the at least one blade, and
   wherein the blade wind detecting device includes a wind direction detecting unit for determining a direction faced by at least one of the plurality of stress sensors based on the pitch angle at a time of measuring by the plurality of stress sensors and detecting a wind direction on the at least one blade based on the determined direction and measurements by the respective stress sensors.

3. The wind power generation device control system of claim 1, wherein the blade wind detecting device further includes a rotational angle acquiring unit for acquiring a rotational angle of rotation of the at least one blade about an axle, the rotation being caused by wind acting upon the at least one blade;
   wherein the detecting device control unit further includes a wind direction detecting unit for determining a direction faced by at least one of the plurality of stress sensors based on the rotational angle at a time of measuring by the plurality of stress sensors and detecting a wind direction on the at least one blade based on the determined direction and measurements by the respective stress sensors.

4. The wind power generation device control system of claim 1, further comprising a nacelle wind direction detecting device attached to a nacelle of the wind power generation device, wherein the blade control device controls at least one of the pitch angle or the yaw angle based on a wind direction detected by the nacelle wind direction detecting device, until the at least one blade reaches rated rotation, and wherein the blade control device controls at least one of the pitch angle or the yaw angle based on the wind direction detected by the blade wind detecting device, while the at least one blade keeps the rated rotation.

5. The wind power generation device control system of claim 1, wherein the blade control device further includes:
   a deviation calculating unit for calculating a wind direction deviation indicating a change in the wind direction observed over a predetermined period;
   a load detecting device for detecting a load applied onto a yaw drive device configured to adjust the yaw angle through rotation; and
   an output device for, when the load applied onto the yaw drive device exceeds a predetermined threshold, outputting to an external device the wind direction deviation and the load applied onto the yaw drive device observed over a specific period of time including a point of time when the load applied onto the yaw drive device exceeds the predetermined threshold.

6. The wind power generation device control system of claim 1, wherein the blade control device further includes:
   a deviation calculating unit for calculating a wind direction deviation indicating a change in the wind direction observed over a predetermined period;
   a load detecting device for detecting a load applied onto a yaw drive device configured to adjust the yaw angle through rotation; and
   an output device for, when the wind direction deviation exceeds a predetermined threshold, outputting to an external device the wind direction deviation and the load applied onto the yaw drive device observed over a specific period of time including a point of time when the wind direction deviation exceeds the predetermined threshold.

7. The wind power generation device control system of claim 1 wherein, when Z denotes a distance from a root of the at least one blade to a tip of the at least one blade, the at least one stress sensor is provided in an area originating from the root of the at least one blade and spanning a distance of 0 to Z/8 toward the tip of the at least one blade.

8. The wind power generation device control system of claim 1, wherein the blade wind detecting device further includes a rotational angle acquiring unit for acquiring a rotational angle of rotation of the at least one blade about an axle, the rotation being caused by wind acting upon the at least one blade, and
   wherein the detecting device control unit simultaneously causes the plurality of stress sensors to measure the stress when the rotation angle acquired by the rotational angle acquisition unit is to be positioned a rotation angle corresponding to a top and a bottom of a rotational track of the at least one blade.

* * * * *